United States Patent
Li et al.

(10) Patent No.: US 6,826,151 B1
(45) Date of Patent: *Nov. 30, 2004

(54) APPARATUS AND METHOD FOR CONGESTION CONTROL IN HIGH SPEED NETWORKS

(75) Inventors: San-Qi Li, Austin, TX (US); Sam Sigarto, Austin, TX (US)

(73) Assignees: SBC Technology Resources, Inc., Austin, TX (US); University of Texas at Austin, Texas, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/488,926

(22) Filed: Jan. 21, 2000

Related U.S. Application Data

(63) Continuation of application No. 08/922,457, filed on Sep. 3, 1997.
(60) Provisional application No. 60/025,099, filed on Sep. 3, 1996.

(51) Int. Cl.[7] .................................................. H04J 1/16
(52) U.S. Cl. ..................... 370/230.1; 370/252; 370/235
(58) Field of Search ............................... 370/232, 234, 370/236, 235, 418, 233, 395.1, 395.43, 395.2, 326, 230.1, 252; 710/54; 709/224

(56) References Cited

U.S. PATENT DOCUMENTS

| | | |
|---|---|---|
| 5,179,549 A | 1/1993 | Joos et al. |
| 5,274,625 A | 12/1993 | Derby et al. |
| 5,280,470 A | 1/1994 | Buhrke et al. |
| 5,313,454 A | 5/1994 | Bustini et al. |
| 5,357,510 A | 10/1994 | Norizuki et al. |
| 5,359,593 A * | 10/1994 | Derby et al. ................. 370/234 |
| 5,400,329 A | 3/1995 | Tokura et al. |
| 5,430,721 A | 7/1995 | Dumas et al. |
| 5,432,713 A | 7/1995 | Takeo et al. |
| 5,434,848 A | 7/1995 | Chimento, Jr. et al. |
| 5,442,624 A | 8/1995 | Bonomi et al. |
| 5,446,733 A | 8/1995 | Tsuruoka |
| 5,455,820 A | 10/1995 | Yamada |
| 5,463,620 A | 10/1995 | Sriram |
| 5,488,609 A | 1/1996 | Hluchyj et al. |
| 5,497,375 A | 3/1996 | Hluchyj et al. |
| 5,509,001 A | 4/1996 | Tachibana et al. |
| 5,583,792 A * | 12/1996 | Li et al. ..................... 709/224 |
| 5,633,859 A * | 5/1997 | Jain et al. .................... 370/234 |
| 5,675,576 A | 10/1997 | Kalampoukas et al. |
| 5,754,530 A * | 5/1998 | Awdeh et al. ................ 370/232 |
| 5,864,538 A | 1/1999 | Chong et al. |

* cited by examiner

*Primary Examiner*—John Pezzlo
(74) *Attorney, Agent, or Firm*—Greenblum & Bernstein, P.L.C.

(57) ABSTRACT

An adjustable bit rate (ABR) feedback control scheme is provided where the effects of multiloop delays and high priority traffic transmission are built into the control model. The data traffic is filtered by a low pass filter. Then, the low frequency bandwidth of the filtered traffic is measured and compared to a predetermined threshold. If the measured value exceeds the threshold, the ABR traffic flow is reduced. If the measured value is less than the threshold, the ABR traffic flow is increased. In addition, a General Prediction Control (GPC) method may be applied to the control model for optimal performance. An object of the invention is to minimize the unused link capacity subject to no congestion, where the ABR traffic is adapted to the low frequency variation of high priority traffic flow for high efficiency.

27 Claims, 14 Drawing Sheets

APPARATUS AND METHOD FOR CONGESTION CONTROL IN HIGH SPEED NETWORKS

CROSS REFERENCE TO RELATED APPLICATIONS

This application is a continuation of application Ser. No. 08/922,457 filed Sep. 3, 1997, which claimed the benefit of U.S. Provisional Application No. 60/025,099 to Zhao et al., filed Sep. 3, 1996, the disclosures of which are expressly incorporated herein by reference in their entireties.

BACKGROUND OF THE INVENTION

1. Field of the Invention

The present invention relates to the field of communications, and to an apparatus and method for congestion control in high speed networks. More particularly, the present invention relates to flow control techniques and the flow control of Available Bit Rate (ABR) traffic in, for example, Asynchronous Transfer Mode (ATM) networks.

2. Background and Material Information

With advanced ATM technologies, future high speed networks will be able to support a wide spectrum of applications with diverse traffic characteristics and service requirements. Using ATM Forum terminologies, traffic is classified into three classes: Constant Bit Rate (CBR), Variable Bit Rate (VBR) and Available Bit Rate (ABR). The CBR and VBR traffic are transmitted in high priority with sufficient reservation of buffer space and link capacity; their arrival rate is normally not adaptable to the changing network environment. In contrast, the ABR traffic is transmitted in low priority using the remaining buffer space and link capacity; their arrival rate is constantly adjustable to avoid network congestion. For low complexity high speed operation, the end to end flow control approach is found superior to that of link by link flow control. Further, the traditional window based flow control is no longer effective in high speed networks and is replaced by rate based control. In the rate based control design, the arrival rate of each ABR connection is dynamically adapted based on network feedback information.

A simple rate based control scheme uses single bit feedback information from the network. An example of such a control scheme is described in M. HLUCHYJ and N. YIN, "On Closed-loop Rate Control for ATM Networks," *Proc. INFO-COM '94*, pp. 99–108 (1994), the disclosure of which is expressly incorporated herein by reference in its entirety. With single-bit feedback, a bit is marked at switching nodes or destination based on some preset congestion status. All the ABR sources will then adjust their transmission rate, based upon the single bit observation. An exemplary single-bit feedback scheme is called negative polarity feedback, and is described in J. C. BOLOT and A. SHANKAR, "Dynamic Behavior of Rate-based Flow Control Mechanisms," *ACM Comp. Comm. Review*, Vol. 20, No. 2, pp. 35–49 (1992), the disclosure of which is expressly incorporated herein by reference in its entirety. In negative polarity feedback, each ABR source reduces its transmission rate exponentially once receiving the negative feedback bit, otherwise each source keeps increasing its transmission rate linearly.

As indicated in the study described in R. JAIN et al., "The OSU Scheme for Congestion Avoidance Using Explicit Rate Indication," *OSU Technical Report*, September 1994, the disclosure of which is expressly incorporated herein by reference in its entirety, a single-bit rate based control is too slow to react to the rapidly changing traffic environment and an explicit rate control scheme should be designed to enhance control performance. One scheme was proposed by JAIN and his co-workers at Ohio State University. In the OSU scheme, a load factor is periodically computed at the congested node, the load factor being the ratio of present aggregate ABR rate to its desired rate. The rate of each individual ABR source in the next period is then simply equal to its current rate divided by the load factor. For example, if the aggregate rate is only one half of its desired rate, each source rate will be doubled in the next period.

The major advantage of most proposed single bit and explicit rate control schemes is their simplicity in implementation. However, to achieve such simplicity neither a dynamic control model nor round trip multiloop delays are considered in the above noted schemes. Yet, there is a price for simplicity which should be considered. First, most existing control schemes induce significant low frequency high magnitude oscillations in each feedback ABR control loop, where the oscillation frequency is directly associated with the round trip delay of each loop. It is intuitively clear that such inherent low frequency traffic oscillations will cause substantial oscillations in queuing process. As a result, a large buffer capacity has to be reserved at each node to absorb the ABR traffic oscillations. Second, the stability of the control schemes is highly sensitive to the high priority CBR/VBR traffic characteristics.

Another problem with most existing attempts on ABR feedback control design is they generally neglect the effect of multiple feedback loop delays and high priority traffic transmission. With multiloop delays, the already existing low frequency high magnitude oscillations of ABR traffic within each loop can become much worse. With high priority traffic transmission, the original control stability conditions can be ruined.

The closed loop stability problem is a major issue for any feedback control scheme. Its solution requires the knowledge of round trip delays of all ABR connections. In fact, the round trip delay is the main obstacle that prevents the prior systems from achieving good congestion control performance; especially within a wide area network, the round trip delay of individual ABR connections can be vastly different. For systems with multiple delays, their feedback controller must be carefully designed to provide closed loop stability, otherwise the systems can easily become unstable.

The study in L. BENMOHAMED and S. MEERKOV, "Feedback Control of Congestion in Store-and-Forward Networks: The Described Case in Single Congestion Node," *IEEE/ACM Trans. Networking*, Vol. 1, No. 6, December 1993, pp. 693–708, the disclosure of which is expressly incorporated herein by reference in its entirety, considers round trip delays and analyzes the closed loop stability of an explicit rate control scheme in the absence of high priority traffic. In the disclosed scheme, a fluid flow queuing model is adopted and the queue size at the bottleneck node is used as the feedback information for the ABR traffic adaption. The feedback controller in BENMOHAMED et al. is designed only with the requirement of closed loop stability. No other performance criteria such as steady state error is considered.

In existing binary bit Available Bit Rate (ABR) congestion control schemes, nodal congestion is often detected by comparison of present queue size with a predetermined threshold. However, the queue threshold detection schemes have disadvantages. First, no congestion can be detected until the queue is longer than the threshold. Second, although the congestion is readily removed as the queue starts dropping, the detection of when the queue dropped below the threshold has unnecessarily extended the congestion period. The delayed detection followed by unnecessary extension of congestion periods significantly increases the oscillation period as well as the oscillation magnitude of ABR traffic within the network, causing a large consumption of buffer resources.

Therefore, despite the advances, congestion control of high speed network switches, such as ATM switches, is still inadequate. Large buffers are required to handle the overflow of data due to inaccurate detection of the network congestion. Moreover, multiple feedback loop delays and high priority traffic transmission has been neglected in existing feedback control designs. Thus, there exists a need for a system which accurately detects the congestion in an ATM network in order to optimize the throughput of ATM networks by controlling the flow of the ABR traffic.

SUMMARY OF THE INVENTION

In view of the foregoing, the present invention, through one or more of its various aspects, embodiments and/or specific features or subcomponents, is thus intended to bring about one or more of the objects and advantages as specifically noted below.

A general object of the present invention is to provide an apparatus and method for congestion control of high speed network switches, including ATM switches.

A further object of the invention is to provide a system which is capable of accurately detecting congestion of high speed network switches, such as ATM switches, in order to optimize the throughput of the network by controlling the flow of traffic.

According to an aspect of the invention, the link capacity requirement of CBR/VBR traffic is captured by its present filtered rate so that the ABR transmission rate will be periodically adapted to the remaining link capacity. However, because of multiloop delay and the CBR/VBR traffic variation, the link capacity will not be fully utilized. Another object of the present invention is therefore to minimize the unused link capacity. An advantage of the present invention is it eliminates unnecessary highly frequent adaptations of ABR traffic rate as found in most existing control schemes, which are caused either by the high frequency variation of CBR/VBR traffic or by the rapid change of queue congestion status. Because of the filtering, the ABR traffic varies very smoothly along with the slow time variation of the low frequency CBR/VBR traffic.

Another object of the invention is to provide an explicit rate ABR traffic control scheme by using a process control design method, referred to herein as Generated Prediction Control (GPC), to provide a closed loop stable controller with linear quadratic optimal performance. An advantage of the present invention is that multiloop delays of ABR connections are built into the design of the control model. The low frequency high magnitude oscillations of ABR traffic flow, as usually found in most proposed ABR control schemes, are therefore eliminated. As a result, not only is the buffer capacity requirement for ABR traffic substantially reduced, but the control stability condition is also significantly improved.

In a preferred embodiment, a new explicit rate control scheme based on the results of frequency domain analysis of multimedia traffic is provided. Examples of frequency domain analysis of multimedia traffic can be found in S. Q. LI and C. HWANG, "Queue Response to Input Correlation Functions: Continuous Spectral Analysis," *IEEE/ACM Trans, Networking*, Vol. 1, No. 6, December 1993, pp. 678–692 (LI (I) et al. hereinafter), and S. Q. LI, S. CHONG, and C. HWANG, "Link Capacity Allocation and Network Control by Filtered Input Rate in High Speed Networks," *IEEE/ACM Trans. Networking*, Vol. 3, No. 1, February 1995, pp. 10–15 (LI (II) et al. hereinafter), the disclosures of which are expressly incorporated herein by reference in their entireties. The inventors have found that the link capacity required by input traffic at each node is essentially captured by the traffic's low frequency characteristics. In other words, no congestion occurs at the node if the control design guarantees that the aggregate CBR/VBR/ABR traffic rate, filtered in a low frequency band, never exceeds the link capacity. All the high frequency traffic is absorbed and smoothed out via limited buffering. Further, the filtered traffic rate is significantly less than its original non-filtered rate.

Another object of the present invention is to provide significant improvement of ABR traffic performance by replacing the queue threshold detection with the bandwidth threshold detection, using an Explicit Forward Congestion Indication (EFCI) scheme. According to an aspect of the invention, a modified EFCI scheme is provided, which is called EFCI-ECD) scheme, where ECD refers to early congestion detection. A simulation study has shown about a 60% savings in buffer capacity for the EFCI-ECD scheme to achieve the same throughput as the original EFCI scheme, providing the same set of source control parameters. The amplitude of the ABR traffic oscillation is reduced by about 50%. Note that the traffic filtering operation can easily by implemented by digital signal processing (DSP) chips. Using today's technology, a common DSP chip only costs a few U.S. dollars whereas the high speed SRAM chips for buffer capacity are relatively much more expensive. Moreover, a single DSP chip can be shared by many links for multiple traffic measurement purposes.

Thus, there are at least three major advantages for the EFCI-ECD scheme of the present invention: (1) none of the existing EFCI protocols at source and destination needs to be changed; (2) the buffer capacity required at each switching node is substantially reduced; and (3) the ABR traffic oscillation is much reduced.

The present invention is described as a traffic congestion control apparatus for use in a network having a plurality of types of data traffic. The data traffic comprises high priority traffic and low priority traffic. The network has a plurality of links through which the data traffic flows, each link being susceptible to data traffic congestion. The apparatus has a processor which comprises a filter through which said data traffic flows, and a sampler which periodically measures a characteristic of the data traffic filtered by said filter. The measured characteristic indicates a present link capacity requirement of the filtered traffic. A flow control system for adjusting a flow rate of the low priority traffic is also provided. The apparatus also comprises a comparator which compares the measured characteristic with a predetermined threshold. The comparator sends a first signal to the flow control system when the measured characteristic exceeds the predetermined threshold to indicate link congestion. The comparator sends a second signal to the flow control system when the measured characteristic is below the predetermined threshold to indicate unused link capacity. The flow control system reduces the transmission rate of the low priority traffic in response to receipt of the first signal and increases the transmission rate of the low priority traffic in response to receipt of the second signal.

The traffic congestion control apparatus may be used in an asynchronous transfer method (ATM) network.

In a preferred embodiment, the filter is a low pass filter.

In another embodiment, a method for controlling congestion in a network is provided. The network has high priority data traffic and low priority data traffic, the low priority traffic being transmitted by a plurality of data inputs. The network comprises a plurality of links through which the data traffic flows. The method comprises filtering the data traffic and then periodically repeating the following steps: sampling the filtered traffic to estimate a present link capacity required by the high priority traffic; determining the remaining link capacity; calculating a transmission rate for each data input to minimize an unused link capacity of each link subject to no congestion; and adjusting a transmission flow rate of each data input to match the calculated transmission rate.

The above listed and other objects, features of advantages of the present invention will be more fully set forth below.

BRIEF DESCRIPTION OF THE DRAWINGS

The present invention is further described in the detailed description which follows, by reference to the noted plurality of drawings by way of non-limiting examples of preferred embodiments of the present invention, in which like reference numerals represent similar parts throughout the illustrations, and wherein:

FIG. 3(a) illustrates the first 5 groups, and FIG. 3(b) illustrates the second 5 groups of 10 groups of video sources;

DETAILED DESCRIPTION OF THE INVENTION

Figure 1:
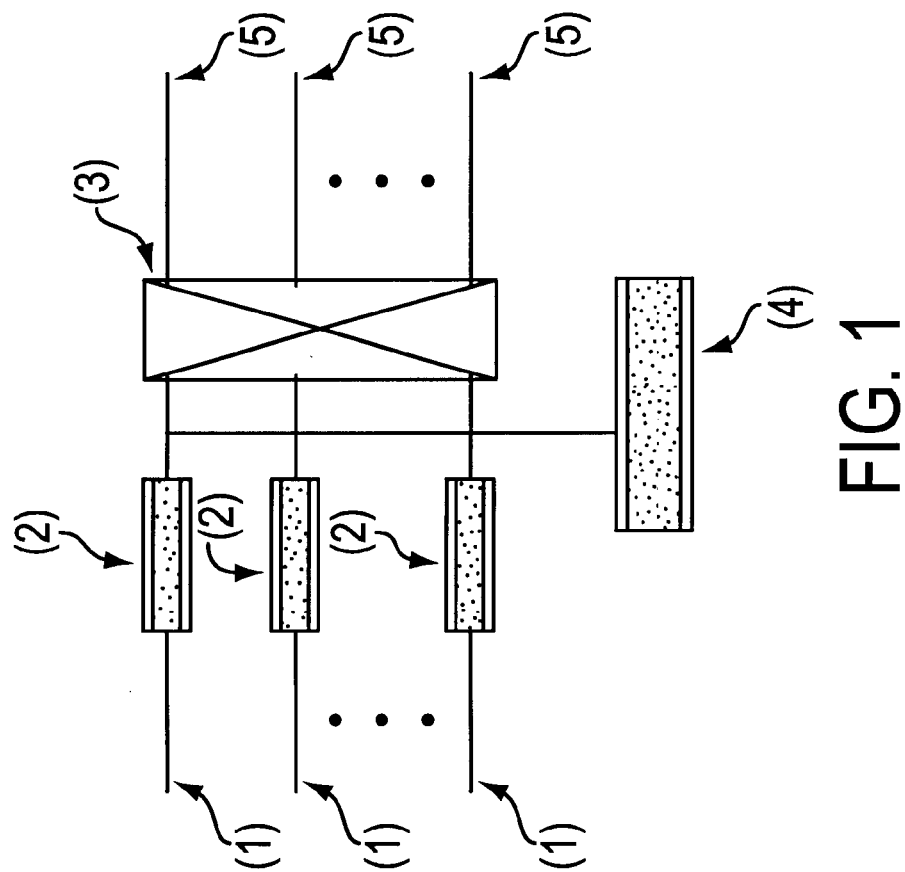
FIG. 1 is a block diagram of an exemplary ATM switch, with input buffer switch architecture, according to an aspect of the present invention.

Referring now to the accompanying drawings, FIG. 1 illustrates a block diagram of an asynchronous transfer method (ATM) switch with input buffer switch architecture. Although actual implementation of the explicit forward congestion indicator, early congest detection (EFCI-ECD) scheme of the present invention depends on the type of ATM switch fabric, for purposes of illustration, the features of the invention will be described with reference to an input buffer switch architecture. Of course, the same principles of the invention will apply for an output buffer switch architecture or a shared buffer switch architecture. Further, although the various features of the invention are described herein with reference to ATM switches, the various features and aspects of the invention may also be applied to other types of high speed network switches.

FIG. 1 shows a block diagram of an ATM switch 10 utilizing the EFCI-ECD scheme of the present invention. Incoming ATM cells arrive at each input port 1, and then are temporarily stored in an input buffer 2. Each input port 1 has one input or queue buffer 2 to receive the incoming ATM cells. A switch medium 3 directs the ATM cells to an appropriate output port 5 based on a predetermined routing derived from the header information contained within a particular ATM cell to be routed. The switch medium 3 may be, for example, a cross bar, or TDM (Time Division Multiplexing) bus and the queue buffer 2 may comprise a SRAM or other memory component.

A processor 4 is provided, which may comprise one or more DSPs (digital signal processors) and/or general purpose processors. The DSPs and/or general purpose processors of the processor 4 may be any suitable combination or set of well known DSPs or general purpose processors, such as those available from Texas Instruments, Analog Devices or Motorola. Where one DSP is provided, each of the input ports 1 is controlled by a single processor 4. If multiple DSPs are provided, each of the input ports 1 may be controlled by its own dedicated processor 4. In the multiple DSP configuration, a master controller (not shown) may be provided for coordination, control and synchronization of each of the DSPs. The processor 4 is programmed to execute the EFCI-ECD method of the invention, as described below. The functions of the processor 4, however, are not limited to performing the described EFCI-ECD scheme, and may also include other functions such as process call setup, and policing input traffic, etc. Further, although a DSP has been described as performing the functions of the processor 4, an application specific integrated circuit (ASIC) may be used in place of a DSP, which could be designed specifically to execute, for example, the low pass filtering of the EFCI-ECD scheme.

To explain the operation of the ATM switch 10, the processing for one input port 1 will now be described. The processor 4 counts the number of arrival ATM cells from each virtual channel of the input port 1 for a time interval T. Dividing the cell arrival counts by the time interval T yields the input arrival rate of the virtual channel. The arrival rates of all virtual channels of the input port 1 is calculated by the processor 4 at each time interval T.

A pre-designed low pass filtering function may be stored in the processor 4. Further, the processor 4 may be programmed by well known techniques, i.e., storing the denominator and numerator coefficients in a ROM or RAM, and downloading the coefficients on power up. By inputting the arrival rates of all CBR/VBR/ABR virtual channels to the low pass filtering function of the processor 4, filtered CBR/VBR/ABR traffic arrival rates are obtained.

To detect a congestion condition at the input port 1, a total of the filtered CBR/VBR/ABR virtual channel traffic arrival rates is calculated by the processor 4, and if the total rate is greater than the link speed of the input port, the link is determined to be congested. Otherwise, the link is determined not to be congested. Alternatively, filtered CBR/VBR arrival rates may be used to determine if the link is congested.

If the link is determined to be congested, the EFCI bit of the ABR data cell is set to indicate the congestion condition. Once the EFCI bit is set, the congestion condition can be alleviated using well known techniques.

1. Dynamic Model of the Congested Node

In this section, network parameters are defined and the dynamic equation of the present invention is derived. The object is to minimize the unused link capacity in steady state subject to no congestion.

1.1 Network Parameters

Assume a single bottleneck link L within the network. There are M number of ABR connections via link L. Denote the set of M source-destination pairs by $$S=\{(s,d)_1, \ldots (s,d)_M\}$$

Introduce the following notations for further discussion:
r(t): aggregate high priority CBR/VBR traffic arrival rate in link L at time t;
$u_k(t)$: ABR traffic transmission rate from the source destination pair $(s,d)_k$ at time t;
$t_c$: control update period;
$t_k$: round trip delay of the k's source-destination pair;
x(t): unused link capacity.
In the congestion control apparatus and method of the present invention, $u_k(t)$, $\forall k$, are the input variables, r(t) is the external disturbance, and x(t) is the controlled variable. The objective is to minimize x(t) in steady state subject to no congestion.

The round trip delay $t_k$ consists of the following components: the packetization and depacketization delay, propagation delay, switch processing delay and queuing delay. As described in M. D. PRICKER, "Asynchronous Transfer Mode—Solution for the B-ISDN, Ellis Horwood Press (1993), the disclosure of which is expressly incorporated herein by reference in its entirety, only the queuing delay is random, which is expected to be less than ten percent of the overall round trip delay in wide area networks. For simplicity, the control design assumes that each ABR connection has a fixed round trip delay.

In every $t_c$ second, the controller at node L estimates the link capacity requirement of the present r(t) via the low pass filter operation. The remaining link capacity is then properly divided among all ABR connections by the congestion control algorithm. For practical control implementation, each round trip delay needs to be quantized in units of $t_c$:

$$t_k = n_k \times t_c + \epsilon_k, \text{ for } \epsilon_k < \frac{t_c}{2}; k = 1, \ldots, M,$$

where $\epsilon_k$ represents the quantization error and $n_k$ represents the number of connections in group $S_k$ (described below). By approximation, $$t_k \approx n_k \times t_c, \text{ for } k=1, \ldots, M.$$

Further, the number of ABR connections at each node in wide area networks, M, tends to be very large. Since M is the size of the input vector, a large input gain matrix may be obtained. The control solution with large M may not be feasible in real time operation. One alternative approach is to partition S into subsets by the round trip delay grouping. That is, all connections with round trip delay equal to $kt_c$ will be grouped into subset $S_k$. There are N such subsets:

$$S_1, S_2, \ldots S_N.$$

In practice, N may not be very large. For example, taking N=10 allows the maximum round trip delay equal to 10 $t_c$. If $t_c$=7 ms, the maximum round-trip delay 70 ms is longer than the United States coast to coast round trip propagation delay. The aggregated ABR transmission rate in each subset $S_k$ is denoted by $u_k$. The grouped input vector is therefore described by:

$$u=[u_1, u_2, \ldots, u_k, \ldots, u_N]^T.$$

Once u is computed by the control algorithm, its individual $u_k$ will be evenly divided among all the ABR connections in $S_k$. Such a division within each subset $S_k$ is completely separate from the computation of u; its execution only requires the present number of ABR connections in $S_k$.

1.2 Congestion Control Model

Because of the discrete time control operation, all system variables r(t), $u_k(t)$ and x(t) are changed into r(n), $u_k(n)$ and x(n) in units of $t_c$, respectively. The system dynamic equation can then be expressed by $$x(n+1) = x(n) + (r(n) - r(n+1)) + \sum_{k=1}^{N} b_k(u_k(n - n_k - 1) - u_k(n - n_k)), \quad (1)$$

where r(n)−r(n+1) represents the one-step variation of high-priority traffic and $u_k(n-n_k-1)-u_k(n-n_k)$ is the one-step variation of ABR traffic. Note that nk in (1) takes account of the $n_k$-step loop delay on the k-th connection group. Further define $b_k$=0 for empty subset $S_k$ and $b_k$=1 otherwise. In wide area networks, each subset $S_k$ is expected to contain a certain number of active ABR connections. The chances for $S_k$ to become empty are therefore negligible. One can generally assume.

$$b_1 = \ldots = b_k = \ldots = b_N = 1.$$

In the system disclosed herein, the controller will keep track of the number of ABR connections in each subset $S_k$. For fairness, the rate assigned to each subset should be proportional to the number of its connections. For the sake of simplicity, assume the fairness to be achieved is given by $$u_1(n) \approx u_2(n) \approx \ldots \approx u_N(n).$$

The fairness problem will be discussed in further detail below.

To convert the dynamic equation (1) to its Z-domain expression, define $$A(z^{-1}) = 1 - z^{-1},$$

$$u = [u_1, \ldots u_N]^T,$$

$$B(z^{-1}) = [b_1(z^{-1}), \ldots b_N(z^{-1})],$$

$$b_k(z^{-1}) = z^{-k}(z^{-1}-1), \forall k \tag{2}$$

Applying them to (1) results in:

$$A(z^{-1}) \times (n+1) = B(z^{-1})u(n) + (z^{-1}-1)r(n+1), \tag{3}$$

For control purposes, $$x(n+1) = P(z^{-1})u(n) - r(n+1), \tag{4}$$

where $$P(z^{-1}) = \frac{B(z^{-1})}{A(z^{-1})}$$

is the transfer function of the controlled system.

The control input u(n) must be non-negative, i.e., $u_k(n) \geq 0$, $\forall k$. Since r(t) is highly unpredictable, r(n) in the system design is treated as an external disturbance with two main advantages. One is for simplicity of the control model whose complexity order is independent of the disturbance. The other is for stability of the control model where the stability condition is also independent of the disturbance.

The frequency domain queuing analysis in LI (II) et al. indicates that the momentary link capacity requirement of r(t) is essentially captured by its filtered low frequency rate denoted by $r_L(t)$. In other words, it is the low frequency behavior of r(t) that can possibly drive the nodal congestion; the high frequency portion of r(t) is perfectly transmitted using limited buffering. For effective congestion control, replace r(n) by $r_L(n)$ in the dynamic equation (1):

$$x_L(n+1) = \tag{5}$$

$$x_L(n) + (r_L(n) - r_L(n+1)) + \sum_{k=1}^{N} b_k(u_k(n-n_k-1) - u_k(n-n_k))$$

where $r_L(n)$ is the filtered r(n) in a properly selected low frequency band. A detailed discussion of the cut off frequency selection for filtering can be found in LI (II) et al., and J. D. PRUNESKI and S. Q. LI, "The Linearity of Low Frequency Traffic Flow: An Intrinsic I/O Property in Queuing System," *Proc. IEEE Infocom '95 Conference*, April 1995, pp. 613–623, the disclosure of which is expressly incorporated herein by reference in its entirety. Therefore, $x_L(n)$ corresponds to the unused low frequency link capacity. Similar to (4), the low frequency dynamic equation in the Z-domain is:

$$x_L(n+1) = P(z^{-1})u(n) - r_L(n+1). \tag{6}$$

The difference between the original dynamic model (4) and the low frequency one (6) is given by:

$$x(n) - x_L(n) = r(n) - r_L(n),$$

where $r(n) - r_L(n)$ represents the high frequency portion of r(n). Since the transport of high frequency traffic does not require extra link capacity, the two models are basically equivalent except that the control of u(n) by $x_L(n)$ is much simpler and more effective than that by x(n) as described in the following.

The major advantages of using $r_L(n)$ are high stability, high efficiency and low complexity. Without filtering, the high-frequency variation of r(n) could cause the unnecessary high frequency fluctuations in the input rate u(n). As a result, all the ABR sources would have to be designed with complexity for frequent adaptations of their transmission rate, which after all is ineffective to reduce the nodal congestion. Further, the high frequency variation of r(n) would easily mislead the direction of link capacity adaptation, which can cause a substantial reduction of link efficiency and even destroy the whole stability condition as explained below. Similar problems exist when the queue length at node L is chosen to be the controlled variable as in BOLOT et al., and BENMOHAMED et al. Since the queue length is not linearly related to the link capacity assignment, it is always difficult to design a link capacity allocation algorithm without inducing the unnecessary ABR rate fluctuations. In contrast, because of the filter operation in the present invention, all the ABR transmission rates change smoothly along with the slow time variation of the low frequency high priority traffic.

Accordingly one can avoid congestion by ensuring the low frequency link capacity constraint $$\sum_{k=1}^{N} u_k(n) + r_L(n) \leq C, \forall n,$$

where C represents the link capacity at node L. The control objective is to minimize $X_L(n)$ is steady state subject to no congestion.

2. Feedback Control Design

The feedback loop control is achieved through the adaptation of the ABR transmission rate u(n) to the unused link capacity $x_L(n)$. In other words, a feedback controller design $K(z^{-1})$ is need such that the ABR input rate vector u(n) is adapted by $$u(n) = -K(z^{-1})x_L(n). \tag{7}$$

Figure 25:
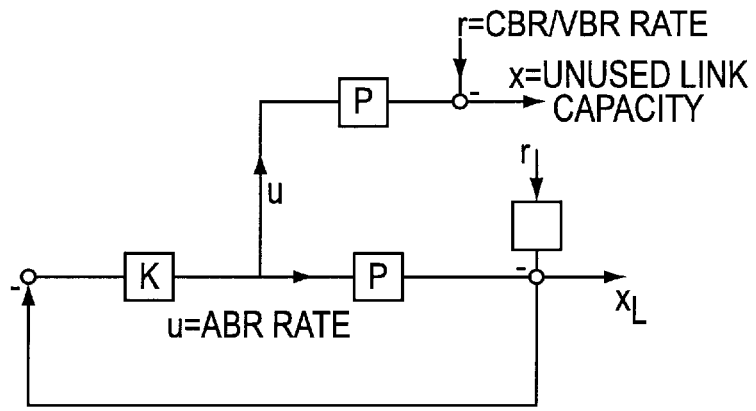
FIG. 25 is a block diagram of an exemplary feedback control design of the invention.

FIG. 25 illustrates, in block diagram form, an exemplary feedback control design of the invention, where the notations, u, x, $x_L$ and r are used to represent the Z-transform of u(n), x(n), $x_L(n)$ and r(n). Substituting u(n) into (4), $$x_L(n-1) = -P(z^{-1})K(z^{-1})x_L(n) - r_L(n+1),$$

Let $F(z^{-1})$ be the low pass filter of the high priority traffic, $$r_L(n)=F(z^{-1})r(n).$$

Let $$S(z^{-1})=\frac{1}{1+P(z^{-1})K(z^{-1})}$$

Resulting in:

$$u(n)=-K(z^{-1})S(z^{-1})r_L(n). \quad (8)$$

Hence, the ABR transmission rate under this feedback control law contains no high frequency component.

Notice that many control schemes can be applied here for the solution K. In accordance with an aspect of the invention, a Generalized Predictive Control (GPC) scheme may be utilized for its simplicity in real time implementations and flexibility for systems with different orders. A GPC method was proposed in CLARK et al. and it has been applied to real chemical engineering control problems. An example of a GPC method, as applied to chemical engineering control, is described in D. W. CLARK, C. MOTHADI and P. S. TUFFS, "Generalized Predictive Control—Part I, The Basic Algorithm," *Automatica*, Vol. 23, No. 2, pp. 137–148 (1987), the disclosure of which is expressly incorporated herein by reference in its entirety.

The GPC method of the present invention may be used to solve the ABR feedback control problem. There is a close relation between GPC and the Linear Quadratic Regulation (LQR) problem. A brief description of the GPC method follows.

A preferred technique for designing the GPC controller is to solve the so called Diophantine equation which is in polynomial form:

$$Ek(z^{-1})\Delta(z^{-1})A(z^{-1})+Fk(z^{-1})z^{-k}=1 \quad (9)$$

where k is an integer. A is the original control system descriptor, which in this case is given by $A(z^{-1})=1-z^{-1}$ defined in (2). The integral function $\Delta(z^{-1}) \approx 1-z^{-1}$ is embedded in the controller to ensure the zero-error performance in steady state, i.e., $\lim_{n\to\infty} x_L(n)$ 0, when $r_L(n+1)-r_L(n)$ becomes a step function (the worst case external disturbance). $E_k$ and $F_k$ are the polynomial solution at each given k. There are many ways to solve (9). One efficient algorithm can be found in CLARK et al. The solution $F_k$ and $E_k$ are related to A and k, independent of the system variables $x_L$, u and $r_L$, and can be obtained by off line computation.

Multiplying $x_l(n+k)$ on both sides of (9) and then replacing $A(z^{-1})x_L(n+k)$ by $B(z^{-1})u(n+k-1)$ from (3), we readily obtain $$x_L(n+k)=E_k(z^{-1})\Delta(z^{-1})B(z^{-1})u(n+k-1)+F_k(z^{-1})x_L(n). \quad (10)$$

Hence, given the current unused link capacity $x_L(n)$, its k-step ahead value, $x_L(n+k)$, can be computed from the (k-1) step ahead input rate $u(n+k-1)$. Taking $k \approx 1, \ldots, H$ for a total of H steps, define $$X_L(n+1) = \begin{bmatrix} x_L(n+1) \\ \vdots \\ x_L(n+H) \end{bmatrix} \in R^H \quad (11)$$

$$U(n) = \begin{bmatrix} u(n) \\ \vdots \\ u(n+H-1) \end{bmatrix} \in R^{HN}, \quad (12)$$

and further introduce a weighting matrix $\Lambda$ $$\Lambda = \begin{matrix} 1 \\ 2 \\ \vdots \\ H \end{matrix} \begin{bmatrix} \lambda_{dg} & & & \\ & \lambda_{dg} & & \\ & & \ddots & \\ & & & \lambda_{dg} \end{bmatrix} \in R^{HN \times HN}, \quad (13)$$

where N is the number of source destination groups S, $\lambda_k$, which must be positive, is the penalty factor for the adaptation of the input rate $U_k$, $\forall k$.

Define the optimal criterion by $$J[U(n)]=X_L^T(n+1)X_L(n+1)+U^T(n)\Lambda U(n). \quad (14)$$

where $$X_L^T(n+1)X_L(n+1)$$

represents the accumulation of squared unused link capacities in consecutive H steps. As in most control analyses, the primary reason to include $U^T(n)\Lambda U(n)$ in (14) is to ensure the non-singularity of the control problem. It is also used to achieve the fairness for link capacity allocation among the N groups of ABR connections, through the weighting matrix $\Lambda$. Increasing penalty factor $\lambda_k$ has the effect of reducing the k-th group transmission rate $u_k$.

The control problem is therefore formulated as to find the solution U(n) for the minimization of J[U(n)] at each n. Although U(n) contains H step control inputs [n(n), . . . , u(n+H-1)], only the most current one u(n) is used. From the solution u(n) and the present disturbance $r_L(n+1)$, the system dynamic equation (6) is used to compute the next step output $x_L(n+1)$. Recursively, from $x_L(n+1)$ the above control procedure is used to compute the next step solution u(n+1).

Here the basic steps for the computation of u(n) are briefly outlined. Refer to CLARK et al. for the detailed computation procedure. Rewrite (10) in terms of $X_L(n+1)$ and U(n) after taking the H consecutive steps:

$$X(n+1)=GU(n)+f(n) \quad (15)$$

where G is a lower triangular matrix with $G \in R^{NH \times NH}$. From (10) the matrix G is expressed from the combination of $E_k$ and $F_k$, $\forall k$. Similarly, the vector f(n) can be expressed as a function of u(n-1) and $X_L(m)$ for some m<n. Substituting (15) into (14), results in:

$$\frac{\partial J}{\partial U} = 2g^T(GU(n)+f(n))+2\Lambda U(n). \quad (16)$$

The optimal solution $U_{opt}$ is derived at $$\frac{\partial J}{\partial U}=0:$$

$$U_{opt}(n)=[\Lambda+G^TG]^{-1}G^Tf(n),$$

While the matrix G can be singular, it is the weighting matrix Λ that ensures the non-singularity of $(\Lambda+G^T G)$. The one step input vector u(n) is then obtained by $$u(n) = \frac{1}{\Delta(z^{-1})} Q_1^T U_{opt}(n), \quad (17)$$

where $Q_1=[I_N, 0 \ldots 0] \in R^{N \times NH}$ takes the first component of U(n) and $\Delta(z^{-1})=1-z^{-1}$ is the integral embedded in the controller. Note that an equivalent closed form of the feedback controller $K(z^{-1})$ can be found in a similar way. The only computational complexity of the control is to derive the inverse matrix $[\Lambda+G^T G]^{-1}$. Since G is fixed 10 for a given control system, the inverse matrix is computed each time when Λ is meant to change. This occurs when the number of ABR connections in each group is significantly changed, so that a new Λ is required to achieve the fairness. In practice, the number of ABR connections can be requantified in each group and a set of possible Λ's can be designed. The solution $[\Lambda+G^T G]^{-1} G$ can then be computed in advance and stored in the system for real time operation.

The fairness performance is an important issue for traffic management. Recall that the transmission rate of each individual ABR connection is assigned at two levels. At the first level, the total available link capacity is properly divided among $[u_1, u_2, \ldots, u_N]$, where the relative magnitude of $u_k$ should be proportional to the number of ABR connections in the k-th group. At the second level, $u_k$ is evenly divided among all the ABR connections of the group. With the GPC control scheme, the relative magnitude of $u_k$'s can be tuned by adjusting the relative value of the penalty factor $\lambda$'s$_k$. Regrettably, there is no direct quantitative relation between $\lambda_k$ and $u_k$. The design of $\lambda_{dg}$ is not only related to the numbers of ABR connections among the N groups, but also dependent on their round trip delay difference. In practice, some rules of thumb may be observed. For example, one can set $$\frac{\lambda_k}{\lambda_{k+1}} \approx 2$$

to achieve $U_k \approx u_{k+1}$, given that the round trip delay is approximated by $kt_c$ and $(k+1)t_c$ with respect to the k-th and (k+1)-th groups. The off line trial and error approach can always be adopted here by adjusting $\lambda_{dg}$ till the fairness of u is obtained. The selection of $\lambda_{dg}$ is independent of the high-priority traffic.

3. EFCI-ECD Control Scheme

It is commonly known that the current EFCI scheme takes large buffer resources with severe oscillation of the ABR traffic. As seen in the next subsection, these two key phenomena are closely related to the congestion detection mechanism used by the EFCI scheme.

3.1 Early Congestion Detection

As mentioned above, nodal congestion occurs whenever the filtered rate of aggregate traffic exceeds the link capacity. Using the queue threshold detection scheme, the detection of congestion occurrence has to be delayed by the amount of time required to build up the queue. Similarly, the detection of congestion resolution is also delayed by the amount of time required to bring down the queue.

Figure 17:
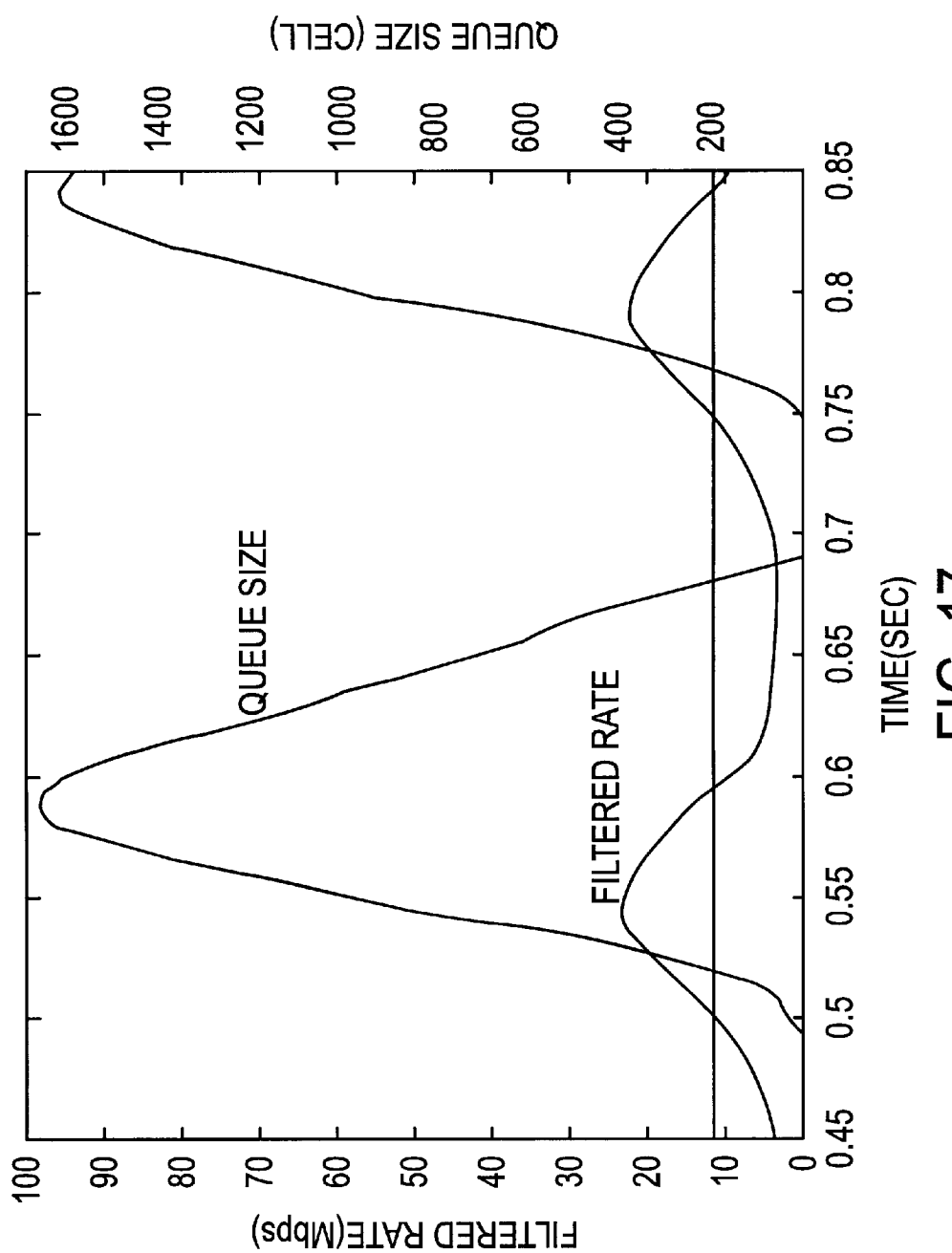
FIG. 17 is a plot of congestion detection comparing the bandwidth threshold scheme of the present invention and a queue threshold scheme of the prior art.

The sample path of a queue and its associated filtered input rate is examined in FIG. 17. The input traffic consists of CBR/VBR/ABR. The CBR/VBR traffic are generated from 10 real time MPEG videos using Bellcore's collection, which are transmitted with high priority, as described in M. W. GARRETT, and W. WILLINGER, "Analysis, Modeling and Generation of Self-Similar VBR Video Traffic," *Proc. ACM Sigcomm*, London, September 1994, pp. 269–280, the disclosure of which is expressly incorporated herein by reference in its entirety. The ABR traffic consists of ten connection groups, which are controlled by the EFCI scheme with queue threshold detection. Detailed configuration of the simulation is provided in the next subsection. The queue threshold is properly adjusted and set at 200 cells to achieve the target link utilization of 90%. As detected by the queue threshold in FIG. 17, the first congestion period starts at t=0.527 sec and ends at t=0.681 sec, lasting for 0.154 sec. In contrast, the bandwidth threshold detection scheme is used and the bandwidth threshold is set equal to 90% link capacity for comparison with the filtered input rate. As also shown in FIG. 17, the first congestion period starts at t=0.513 sec and ends at t=0.597 sec. lasting for 0.084 sec. For comparison purposes, the two thresholds in FIG. 17 are overlapped after properly scaling the filtered input rate on the left side Y-axis and the queue length on the right side Y-axis. This example clearly shows the shortcoming of the queue threshold scheme.

It is not difficult to understand why the bandwidth threshold detection scheme significantly outperforms the queue threshold detection scheme. First, the early nodal congestion detection will lead to the early feedback control reaction by ABR sources to improve the performance. Second, the much reduced congestion period will significantly reduce the oscillation periods in each of the ABR control loops and hence result in much reduced oscillation magnitude. (The second aspect of the improvement plays a more important role than the first one.) These advantages of bandwidth threshold detection are indeed verified by the following studies in the proposed EFCI-ECD scheme.

4. Simulation Study of Feedback Control of Multiloop ABR Traffic

Figure 18:
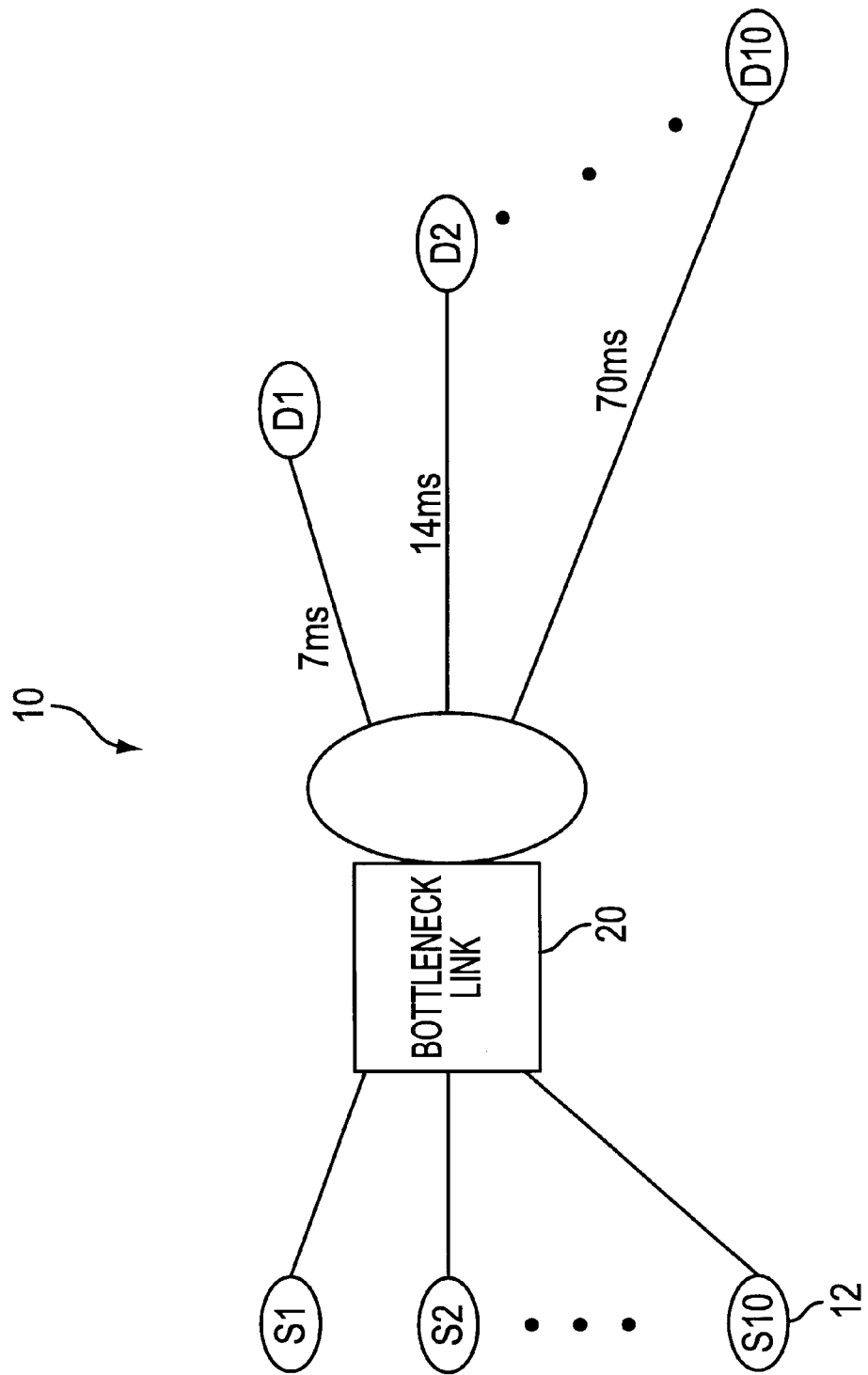
FIG. 18 is a block diagram of an exemplary network architecture, with a single congestion link and ten ABR connection groups, in accordance with an aspect of the present invention.

For the simulation study, refer to FIG. 18. A single congested node 20 within the network 10, supporting ten groups of ABR connections 12 $\{S_1, S_2, \ldots, S_{10}\}$, i.e., taking N=10 in (1) is considered. The control updating period $t_c$=7 ms is chosen. The feedback loop delay of each connection in $S_k$ is fixed at $kt_c$ unless otherwise stated. The multiple loop delays within the network are then in the range of 7 ms to 70 ms, which is equivalent to one to ten control steps.

The CBR/VBR high-priority traffic r(t) at the node 20 is generated from real JPEG/MPEG video segments of the movie Star Wars, which are highly bursty and strongly correlated, as described in GARRETT et al. The original JPEG video files were recorded in bytes in 1.4 ms slice time units and the MPEG files were in 42 ms frame time units. The bytes are converted into cells; each cell consists of 48 bytes of video and 5 bytes of header. In computer simulation, the queuing process is evolved at every 0.14 ms in discrete time. Converting the input slice/frame time unit into the queuing simulation time unit, all cells generated in each slice/frame unit are assumed to be randomly allocated among the corresponding simulation time units by uniform distribution.

The filtered high priority traffic is measured periodically at the control interval $t_c$, denoted by $r_L(n)$ at the n-th interval. At each control step, the controller uses $r_L(n)$ and (8) to compute the optimal input rate vector $u(n)=[u_1(n), u_2(n), \ldots, u_{10}(n)]$, which will feedback to each individual ABR source with its defined loop delay. In the GPC design 40 steps of prediction may be utilized, i.e. H=40 in (11).

The simulation study in the following subsections also considers the effect of random feedback loop delays and non-uniform ABR rate distributions. The total volume of the under lying high priority traffic changes from a single video source to the aggregation of 10 video sources.

4.1 With Non-causal Filter

One major issue in design of low frequency control is the selection of a low pass filter (LPF). A good LPF not only captures the low frequency characteristics but also requires less filtering delay. Intuitively, the filtering delay will postpone the network control response to burst arrivals of the high priority traffic. Note that the burst arrivals are typical low frequency behavior of the traffic. As a result, a longer filtering delay is more likely to mistrack burst arrivals which may cause nodal congestion. In practice, a prediction scheme to minimize the effect of the filtering delay in evaluation of $r_L(n)$ may be designed.

For simplicity, first consider a non-causal LPF which has no filtering delay. Although non-causal filters cannot be implemented in real systems, its control performance can be thought as the ideal case of the low frequency control. Also assume a fairness condition $u_1 \approx u_2 \ldots \approx u_{10}$, which is approximately achieved by the following $\lambda_{dg}$ assignment:

$$[\lambda_1 \lambda_2, \ldots, \lambda_{10}] = [150, 100, 80, 50, 30, 20, 10, 5, 2.5, 1] \quad (18)$$

Note that $\lambda_k$ declines inversely with its loop delay.

Figure 2A:
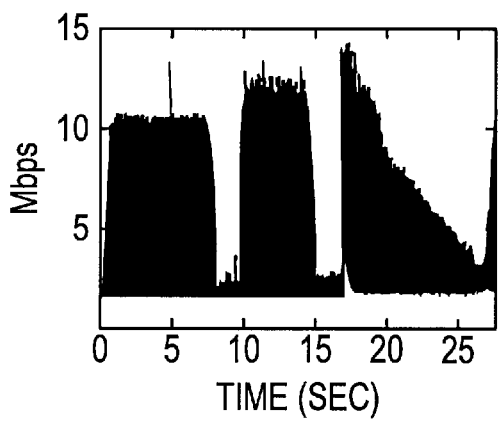
FIGS. 2(a) and 2(b) are plots of a 28-sec JPEG video sample sequence and the same 28-sec JPEG video sample sequence as filtered by non-causal low-pass filtering.
Figure 2B:
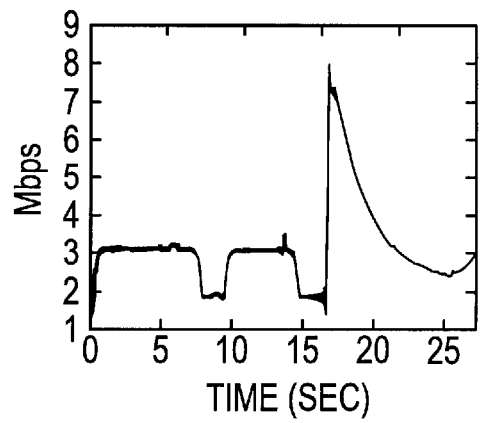
Figure 3A:
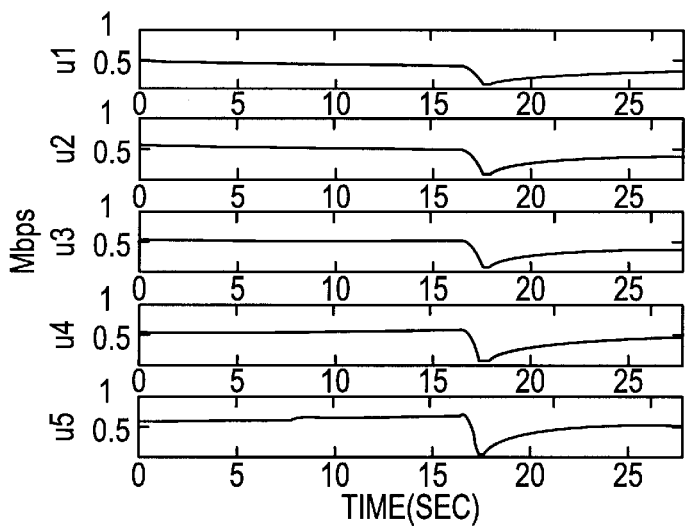
FIGS. 3(a) and 3(b) illustrate ABR transmission rates without filtering delay, where
Figure 3B:
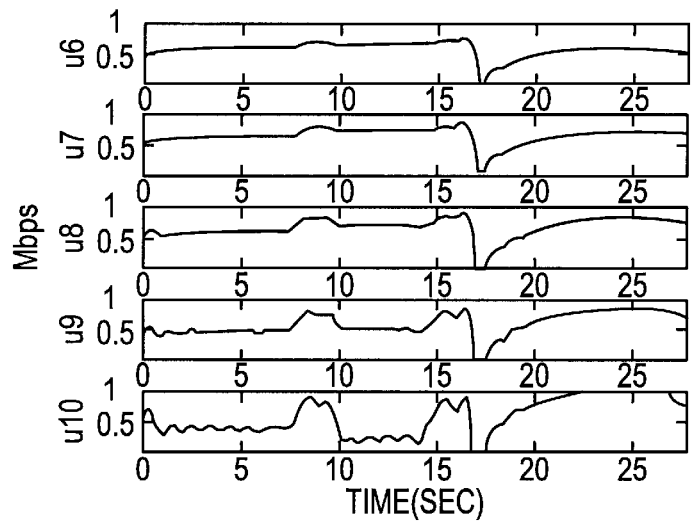

The high priority traffic is represented by a 28-sec JPEG video sample path in FIG. 2(a). Its low frequency, counterpart, filtered with a non-casual LPF at the cut off frequency $\in_c = 45$ rad/sec, is plotted in FIG. 2(b) for comparison purposes. While the original peak arrival rate is 14 Mbps, the filtered rate is only 8 Mbps. The average rate of the single video source is 3.0 Mbps. Assign the link capacity equal to C=10 Mbps, which is greater than the filtered peak rate of the video to ensure the delay quality of the high priority traffic transmission. FIGS. 3(a) and 3(b) illustrate the ABR rate time evolution of the ten groups, wherein FIG. 3(a) illustrates the first five groups and FIG. 3(b) illustrates the second five groups. Obviously, the ABR rate variation is caused by the low frequency variation of the high priority video. Unlike most proposed ABR control schemes, the ABR transmission rates using the new scheme contain neither high frequency variations, nor low frequency oscillations. The former has been removed by the filtering operation of the high priority traffic; the latter has been eliminated by the GPC method.

Figure 4A:
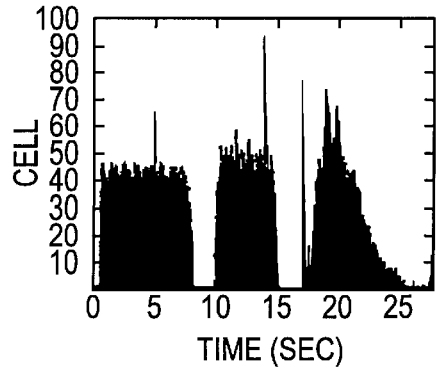
FIGS. 4(a) and 4(b) are graphs of buffer occupancy and unused link capacity.

In this example, the link capacity utilization is 30% for video and 69% for ABR traffic, which leads to the total utilization $\rho$=99%. Under such a high utilization, the aggregate queuing process in FIG. 4(a) is found surprisingly small, with respect to the maximum queue length $\rho_{max} \approx 95$ cells. The advantages of low-frequency control and the GPC method are clearly seen.

Figure 4B:
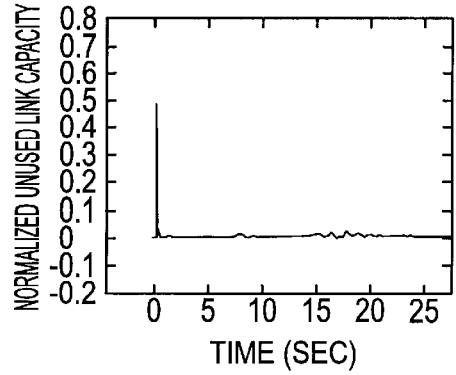

From FIG. 4(b) the behavior of the unused low frequency link capacity $x_L(t)$ can also be observed. For convenience, the solution $X_L(t)$ in FIG. 4(a) has been normalized by the total link capacity C. First, $x_L(t)$ converges rapidly from the initial worst case condition to zero. Second, the variation of $x_L(t)$ is insensitive to the bursty high priority traffic. Ideally, $x_L(t)$=0 is achieved.

4.2 With Causal Filter

Now the effect of filtering delay on the control performance is examined using the same example except the non-causal filter is replaced with a causal filter. Here a moving average LPF with hamming window is chosen. The window size is designed at 140 ms; the filtering delay is equal to 70 ms (one-half of the window size). Note that taking 140 ms window size in the time domain filter design is somewhat equivalent to taking 45 rad/sec cut off frequency in the frequency domain filter design. For the discrete time implementation, each window consists of 100 steps with 1.4 ms per step. The filtered video sequence shown in FIG. 5 is basically identical to the one by the non-causal filter in FIG. 2(b) except with 70 ms filtering delay.

Figure 6A:
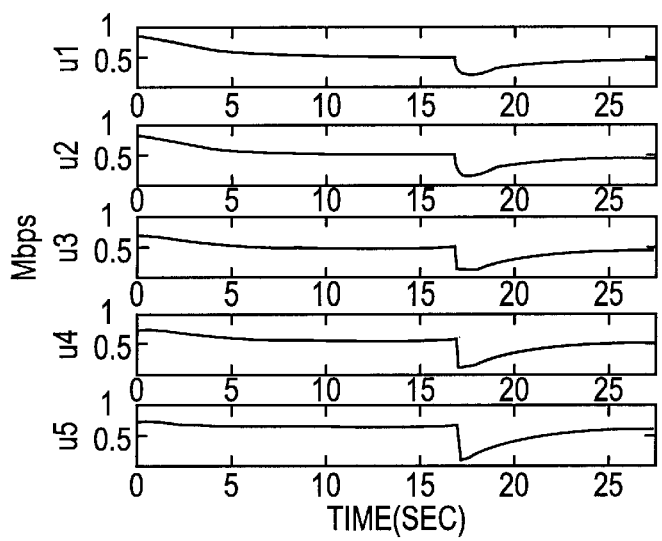
FIGS. 6(a) and 6(b) illustrate the ABR transmission rate with a 70 ms filtering delay of the first 5 groups and the second 5 groups of 10 groups of video sources.
Figure 6B:
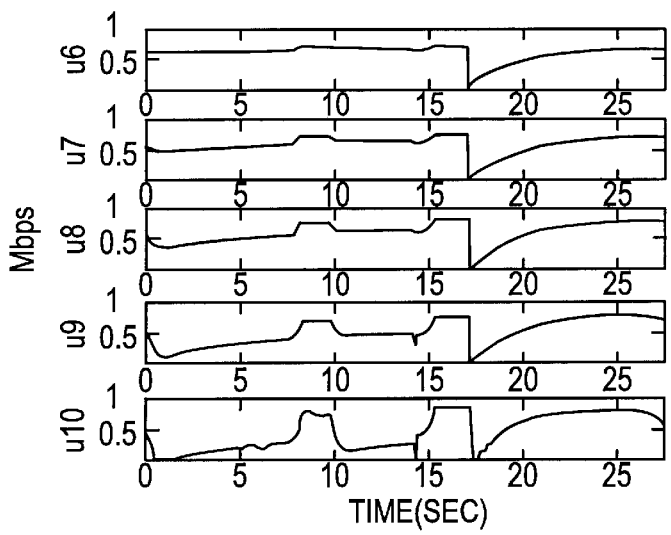
Figure 7A:
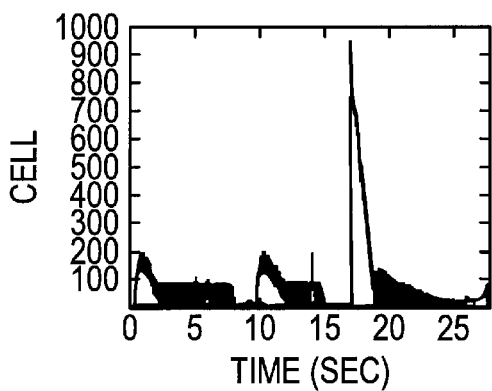
FIGS. 7(a) and 7(b) are graphs of buffer occupancy and remaining link capacity with filtering delay.
Figure 7B:
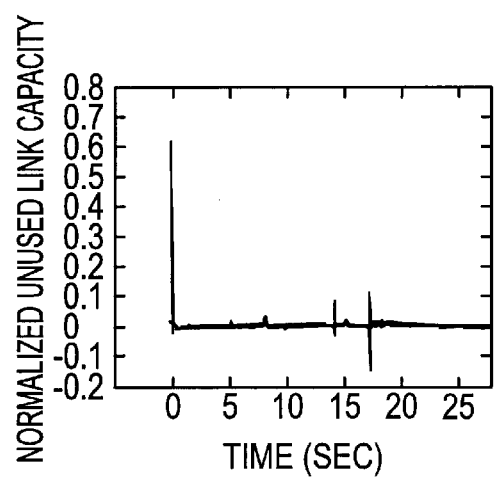

To identify the effect of filtering delay, assume the same link capacity C=10 Mbps as in the non-causal filtering case. The ABR transmission rate behavior of the ten groups in FIGS. 6(a) and 6(b) (where FIG. 6(a) is the first five groups and FIG. 6(b) is the second five groups), is basically identical to that of the non-causal filter in FIGS. 3(a) and 3(b), which are smoothly adapted to the variation of the filtered high priority traffic. Similarly in FIG. 7(b), the unused link capacity basically stays at zero. As a result, the total link utilization also reaches 99%. The introduced filtering delay, however, requires much more buffer space as shown in FIG. 7(a), where $q_{max}$=950 cells in contrast to 95 cells without filtering delay.

Figure 5:
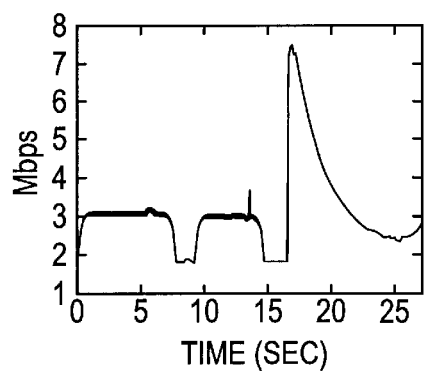
FIG. 5 is a graph of a filtered 28-sec JPEG video sequence which has been filtered by causal low pass filtering.

Note the rapid queue build up at the 17th sec, which corresponds to the worst burst arrival of the low frequency video in FIG. 5. Because of the 70 ms filtering delay, the ABR rate controller will not be able to immediately respond to such a burst. As a result, the high priority burst arrival will cause the buffer accumulation for the consecutive 70 ms period. From FIG. 5 it is seen that the low frequency burst jumps from 1.7 Mbps to 8.5 Mbps, causing the queue increment at 5.8 Mbps rate for the next 70 ms. A simple calculation will show the equivalent queue built up equal to 958 cells (i.e., 5.8 Mbps×70 ms/53 bytes/8 bits), which is exactly what is seen in FIG. 7(a).

Clearly, the filtering delay is inevitable with the low frequency control approach. The amount of the filtering delay is related to the low frequency characteristics of the high priority traffic and also to the selection of the LPF. In practice, a traffic prediction scheme may be applied to reduce the effect of the filtering delay. Once the filtering delay is fixed, the network must be designed with the capability to absorb the worst case low frequency burst arrivals for the filtering delay period. This can be achieved by the reservation of sufficient buffer space and/or link capacity. The actual amount of the reservation can be quantitatively identified once the filtering delay and the allowable worst case burst arrivals are provided in the network design.

Figure 8:
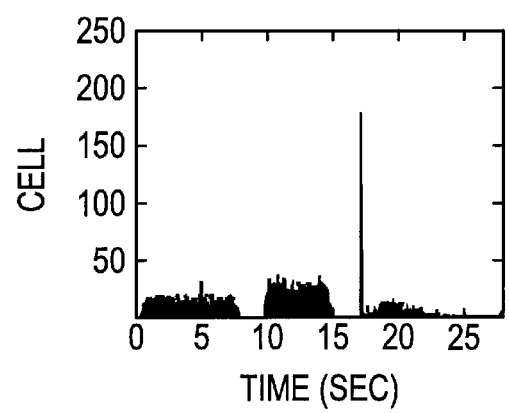
FIG. 8 is a graph of buffer occupancy at 80% link capacity utilization.

For instance, more link capacity can be reserved instead of taking more buffer space to accommodate the Filtering delay. In the previous example, the unused link capacity is targeted at zero for optimal control, which leads to $\rho \approx 99\%$ and $q_{max}$=950. On the other hand, the link utilization can be reduced for less buffer space. Change the target value of the unused link capacity from zero to 20% link capacity. Correspondingly, the design link utilization is changed from 100% to 80%. For the same example, $q_{max}$ is reduced to 180 cells at p=80% in FIG. 8.

4.3 With Variation of ABR Connections

In real networks, the number of ABR connections at each group is subject to change. For control fairness, the aggregate ABR transmission rate at each group, $u_k$, should be adapted accordingly. Denote the number of connections in group $S_k$ by $n_k$. For example, when $n_k$ is reduced by 10%, the relative value of $u_k$ in u should also be reduced by 10%. Under the GPC control, such fairness can approximately be achieved by tuning the associated penalty factor $\lambda_k$. So far no rigorous relation has been established between the penalty factor $\lambda_k$ and the relative weight of $u_k$ in u.

Figure 9A:
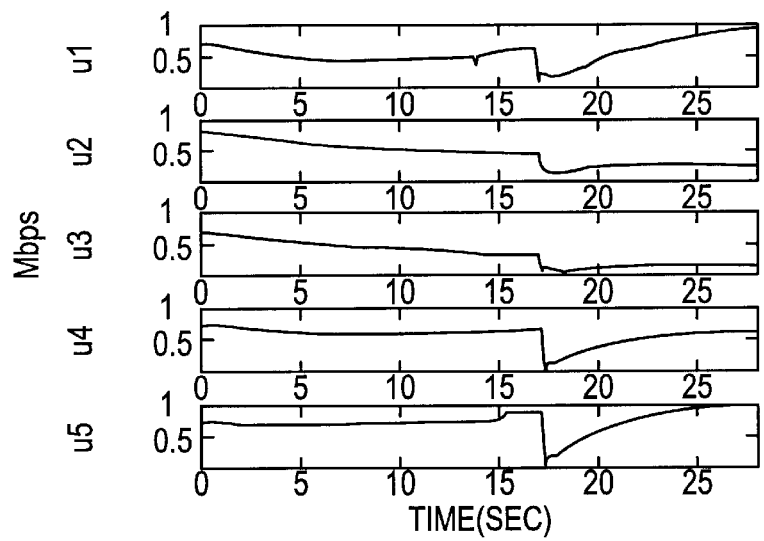
FIGS. 9(a) and 9(b) illustrate the ABR transmission rates for the first 5 groups and the second 5 groups of 10 groups of video sources with adaptation to balancing of the ABR connections.
Figure 9B:
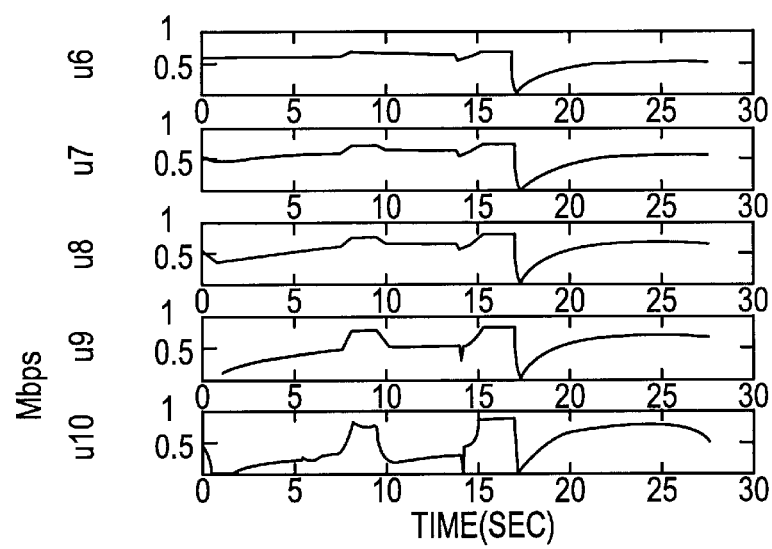

Use the same 28-sec JPEG video sequence for the high priority traffic. For the first 5 ABR groups, suppose that $n_k$ at k=1, ..., 5 changes in every 2.8sec interval, consecutively for the whole 28 sec period. The changes in every 2.8 sec interval are represented by 3% for $n_1$, +2% for $n_2$, +3% for $n_3$, −1% for $n_4$ and −2% for $n_5$, respectively. The positive sign in percent represents the relative increment of $n_k$ and vice versa for the negative sign. The corresponding change of $\lambda_k$ at every 2.8 sec is assumed to be inversely proportional to the variation of $n_k$. That is, +3% for $\lambda_1$, −2% for λ2, −3% for λ3, +1% for $\lambda_4$ and +2% for λ5, respectively. The initial values of $\lambda_k$ are assigned by (18) as in the previous examples for the uniform fairness: $n_1=n_2=\ldots, =n_{10}$. The corresponding ABR traffic rate adaptations are shown in FIGS. 9(a) and 9(b). The comparison between FIGS. 6(a) and 9(a) for the first 5 groups indicates the effectiveness of $\lambda_{dg}$ adaptation for balancing the ABR connections. The main purpose of this example is to show the robustness of the proposed control algorithm to the changing environment of the ABR connections.

4.4 With Random Round Trip Delays

The analysis and simulation described so far have been based on the assumption of deterministic round trip delays, which is not realistic once the queuing process is involved. Here the effect of random delays on the control performance is examined. In high speed networks assume that about 10% of the round trip delay is attributed to the random queuing delay. Note that the control update period at the congested node is always fixed regardless of the randomness of round trip delays. The queuing process can cause delay variations of nodal feedback information to ABR sources and also delay variations of ABR traffic to the congested node.

Express the round trip delay of the k-th connection group by $$t_k(n) = kt_c + x_k(n) \quad (19)$$

at the n-th control time interval $t_c$ and $t_c$ is fixed at 7 ms. x(n) represents the accumulated random queuing delay of the k-th loop. Knowing that the queuing delay process should be strongly autocorrelated, the variation of $x_k(n)$ may be characterized as follows:

$$x_k(n+1) = 0.9 x_k(n) + b_k \omega(n),$$

where ω(n) is a Gaussian white noise and the parameter $b_k$ is directly related to the variance of $x_k$. The coefficient 0.9 is chosen to reflect the strong correlation of queuing delays in adjacent time units. Also $E[x_k(n)]=0$ because the average delay has already been taken into account by $kt_c$ in (19). The distribution of $x_k$ is Gaussian in steady state. The parameter $b_k$ is designed by the following tail distribution constraint:

$$Pr(|x_k(n)| \leq kms) = 0.98.$$

Such a constraint design ensures that the random delay portion in each ABR connection is proportional to its average round trip delay. For instance, at k=5 the average delay of $t_k(n)$ is fixed at 35 ms and the random delays $x_5(n)$ fall in the range of [−5 ms, +5 ms] with 98 percentile.

Figure 10:
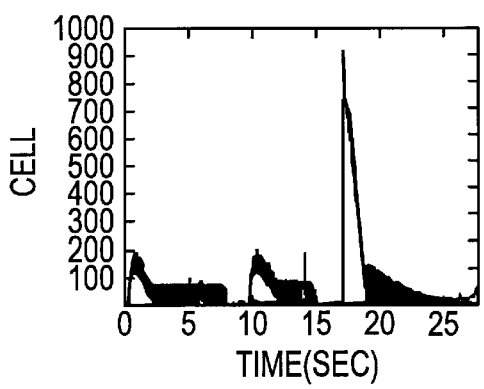
FIG. 10 is a graph of buffer occupancy behavior with random round trip delays at 99% link capacity utilization.

Using the above random delay model, the simulation study based on the same example as in Section 4.2 shows virtually no impact of the random delays on the queuing process (by comparison of FIG. 10 and FIG. 7(a)). In general, as long as the random delays are kept in a small portion of their round trip delays, the impact of the random delays on control performance is expected to be small. This is because the ABR transmission rates are smoothly adapted to the slow time variations of the low frequency high priority traffic. The time scale of such slow time variations is expected to be significantly longer than the round trip delays. Hence, the relatively small time varying scales of the round trip random delays should not have significant impact on the overall control performance.

4.5 With Aggregate High Priority Traffic

In all of the above examples, a single JPEG video source represents the underlying high priority traffic. In reality, a large number of CBR/VBR sources are likely to be multiplexed on a high speed link. By the law of large numbers, the aggregate high priority traffic is expected to become less bursty, which will improve the ABR control performance.

Figure 11:
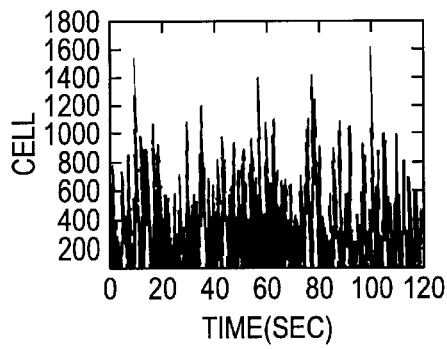
FIG. 11 is a graph of buffer occupancy behavior with aggregation often high priority JPEG sources with filtering.

For instance, randomly select ten independent 2 minute JPEG video sequences from the movie Star Wars. The average of the aggregate high priority traffic is 51 Mbps. The link capacity C=67 Mbps is allocated, which is sufficient to transport the high priority traffic without significant queuing delays. The link utilization of the high priority traffic is then given by 76%. The aggregate sequence is then filtered by the same moving average LPF with 70 ms filtering delay. The simulation study in FIG. 11 shows $q_{max}$=1,600 cells at the total utilization ρ=96%. The ABR transmission rates behave similarly to what is already observed in the previous subsections. Note that the maximum queuing delay in this case is 10 ms whereas it is equal to 40 ms in the previous single source case.

Figure 12:
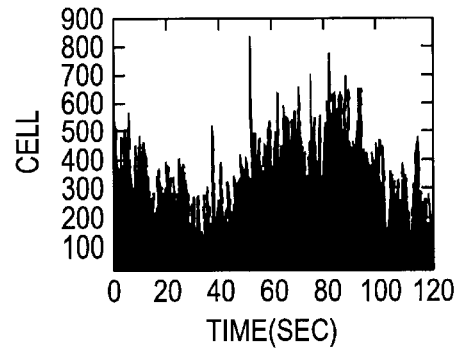
FIG. 12 is a graph of buffer occupancy behavior with aggregation of ten high priority MPEG sources with filtering.

Another example has been conducted with the aggregation of ten independent 2 minute MPEG video sequences from the same movie Star Wars. The average high priority traffic is 28 Mbps and the link capacity is assigned at C=60 Mbps. While the link utilization of the high priority traffic is 46%, the total link utilization reaches 93% at $q_{max}$=830 as shown in FIG. 12. Again, the relative large queue length behavior in FIGS. 11 and 12 are mainly caused by the 70 ms filtering delay.

4.6 On Control Stability and Traffic Oscillation

As described above, feedback control schemes which do not consider round trip delays may induce low frequency high magnitude oscillations in ABR connections. To illustrate the side effect of such oscillations, the load factor approach of the OSU scheme for ABR traffic adaptations is examined. As in JAIN et al., the load factor is defined as the ratio of the present aggregate ABR arrival rate to its desired rate, where the desired rate is defined as the remaining link capacity after the transmission of high priority traffic. The load factor is computed at 7 ms intervals. The next ABR rate is equal to its present rate divided by the load factor. In the subsequent discussion, refer to this method as the load factor approach. To avoid queue congestions, set the desired link utilization p at 80% rather than 100% as in the previous subsections. In other words, 20% of the total link capacity is kept unused when computing the load factor. For comparison purposes, take the same two examples as in FIGS. 11 and 12 with the aggregation of ten JPEG/MPEG video sources. The same link capacities are assigned here, but no filtering operation is implemented on the high priority traffic.

Figure 13:
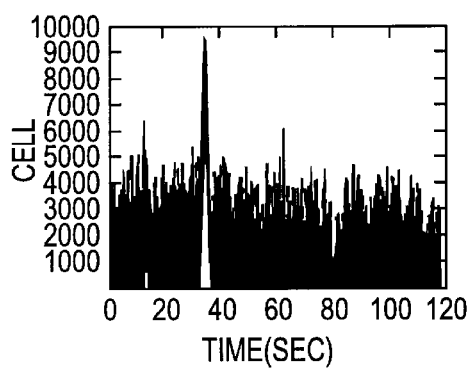
FIG. 13 is a graph of buffer occupancy capacity for ten JPEG without filtering.
Figure 14:
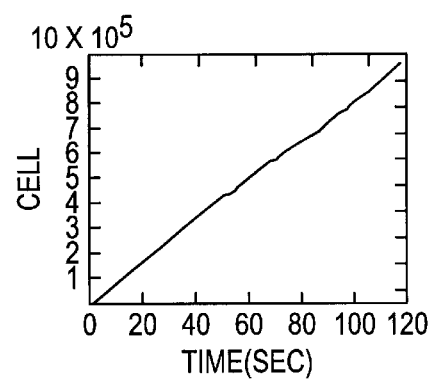
FIG. 14 is a graph of buffer occupancy capacity in presence often MPEG video sources without filtering.

In the case of the aggregate JPEG traffic, the simulation study of the load factor approach shows that the link utilization reaches ρ=90%, rather than 80% as desired, while the maximum queue length is $q_{max}$=9,500 cells as shown in FIG. 13. In contrast, using the GPC method provides the solution $q_{max}$=1,600 cells at ρ=96% in FIG. 11. More importantly, the control stability of the load factor approach is shown to be highly sensitive to the unpredicted behavior of the high priority traffic. For instance, when the same load factor approach is applied in the aggregate MPEG traffic case, the queuing solution soon becomes unstabilized as found in FIG. 14. Comparatively, using the GPC method provides the solution $q_{max}$=830 cells at $\rho$=94% as shown in FIG. 12, which is close to that of the JPEG case.

Since the CBR/VBR traffic in high speed networks is expected to be highly bursty and unpredictable, it is of paramount importance for the stability of the ABR control scheme to be insensitive and robust to a wide range of CBR/VBR traffic characteristics. In the control model design of the present invention, because the high priority traffic has been treated as the external disturbance, the ABR control stability is independent of the high priority traffic. This should be one of the most desirable ABR control properties.

Figure 15:
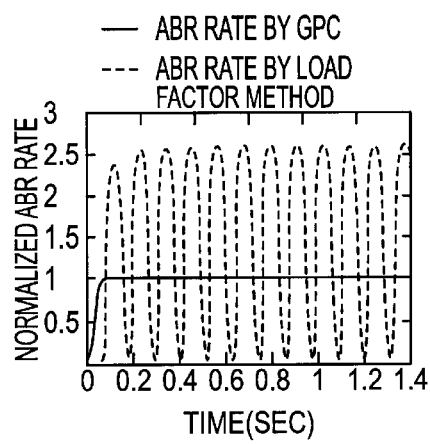
FIG. 15 is a graph of aggregate ABR traffic showing a comparison between the GPC method of the present invention and the load factor approach of the prior art.
Figure 16:
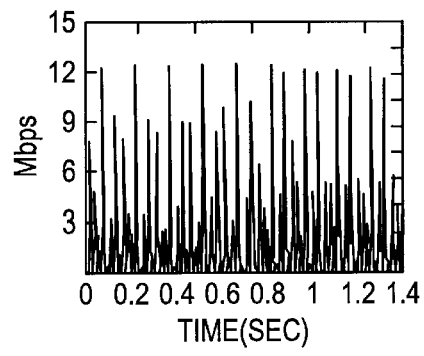
FIG. 16 is a graph of a single group of ABR traffic in the presence of high priority traffic using the load factor approach of the prior art.

In order to further isolate the effect of round trip delays from that of the high priority traffic, consider a case without high priority traffic. The link capacity is fixed at C=6 Mbps for transport of ten ABR connection groups. The aggregate ABR rate is set at zero initially. In the ideal control case, the aggregate ABR rate shall soon reach the total link capacity and stay there ever since. This is exactly what is achieved by the GPC method as illustrated by the solid line in FIG. 15, where the ABR rate is normalized by the link capacity C. In contrast, the strong low frequency high magnitude oscillations of the aggregate ABR rate is seen when using the load factor approach (illustrated by the dotted line in FIG. 15). The oscillation frequency is directly associated with the round trip delays; the oscillation magnitude can be as high as 2.5 C. It is obvious that the ABR rate will never converge to C. The oscillation behavior is expected to get even worse in the presence of high priority traffic. This is well explained in FIG. 16 where the ABR transmission rate in one of the ten groups is plotted using the load factor approach. One JPEG video source has been used to represent the high priority traffic. The corresponding solution by the GPC method was previously studied in FIG. 7.

5. Simulation Study of EFCI-ECD Control Scheme

The new EFCI-ECD scheme of the invention replaces the queue threshold detection of the prior art with the bandwidth threshold detection. All the end to end feedback control protocol functions remain unchanged as the existing ones. In most simulation examples of this study, more than 60% buffer capacity can be saved as compared to the existing EFCI scheme for the same link utilization. Note that the traffic filtering operation can easily by implemented by digital signal processing (DSP) chips. Using today's technology, a common DSP chip only costs a few U.S. dollars whereas the high speed SRAM chips for buffer capacity are relatively much more expensive. Moreover, a single DSP chip can be shared by many links for multiple traffic measurement purposes.

Computer simulation is used to study the ABR performance. As shown in FIG. 18, a single bottleneck link 20 with ten active ABR connection groups is considered. The underlying CBR/JBR traffic with high priority transmission are represented by the superposition of different MPEG video segments collected from the movies Star Wars, which are highly bursty and strongly correlated (see, e.g., GARRETT et al.). Due to the delay time constraint on real time services, it is assumed that the CBR/VBR traffic alone cannot cause the network congestion, which should be ensured by a proper design of call admission control. In the simulation design, the link utilization of CBR/VBR traffic is always set at 33%. The purpose of the ABR control scheme is to effectively adjust the transmission rate of the ten ABR connection groups for a high utilization of the remaining link capacity.

Let the source destination pair of each ABR connection be denoted by $(S_1,D_1)$, . . . , $(S_{10},D_{10})$, respectively. The round-trip delay for the $(S_k,D_k)$ connection is assumed to be fixed and equal to 7*kms for k=1, . . . , 10, such that the round-trip delay of different connections ranges from 7 ms to 70 ms. Moreover, all sources are assumed to be located right at the front of the link, such that there is no delay between the sources and the link. Resource Management (RM) cells are periodically generated by the sources at every $\Delta T$=7 ms. The original MPEG video files were recorded in bytes in 42 ms frame time units. The bytes are converted to cells; each cell contains 48 bytes of video and 5 bytes of header. In the computer simulation, the queuing process is evolved at every 1.4 ms in discrete time. To convert the input frame time unit of 42 ms into the simulation unit of 1.4 ms, all cells generated in each frame time unit are assumed to be randomly allocated among the corresponding simulation time units by uniform distribution.

Throughout the application, two CBR/VBR traffic streams are considered. The first one is taken by the superposition of 10 randomly selected 2 minute MPEG segments to represent the CBR/VBR traffic on a low speed link. The second one is the superposition of 100 randomly selected 2 minute MPEG segments to represent the CBR/VBR traffic on a high speed link. By the law of large numbers, the latter traffic is much smoother than the former one. For the 10 MPEG video traffic, the aggregate average rate is equal to 3.9 (Mbps); the overall link speed is set at C=11.8 (Mbps) for the link utilization $\rho_{MPEG}$=33%. For the 100 MPEG video traffic, the aggregate average rate is equal to 38 (Mbps); the overall link speed is set at C=112.6 (Mbps) for $\rho_{MPEG}$=33%.

Figure 19B:
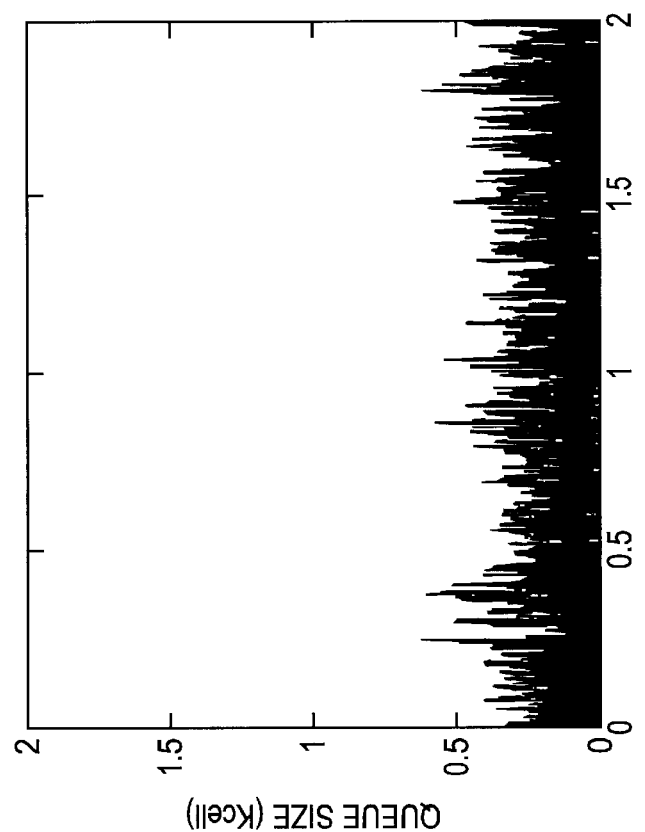
FIGS. 19(a) and 19(b), respectively, are plots of buffer occupancy of the EFCI and EFCI-ECD schemes for the 10 segment MPEG case.
Figure 19A:
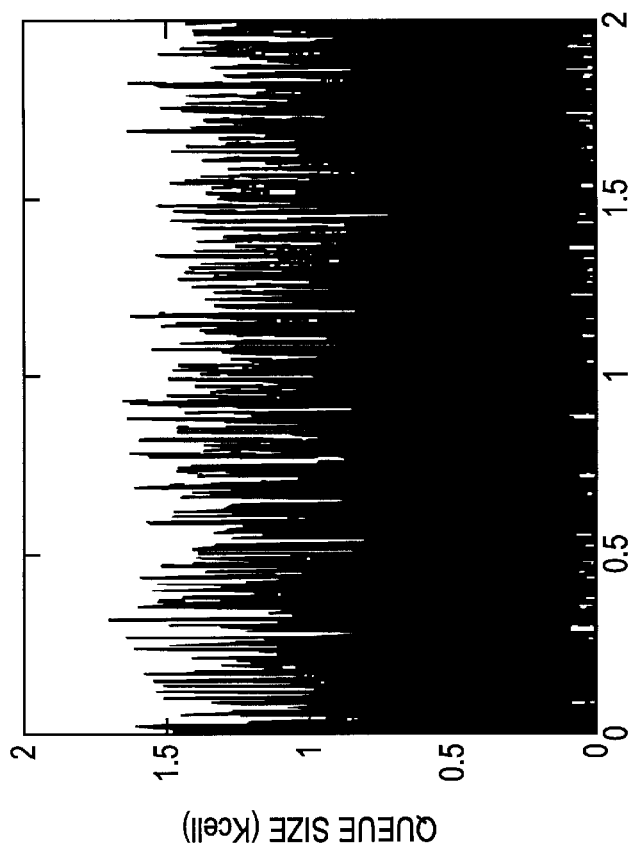
Figure 20A:
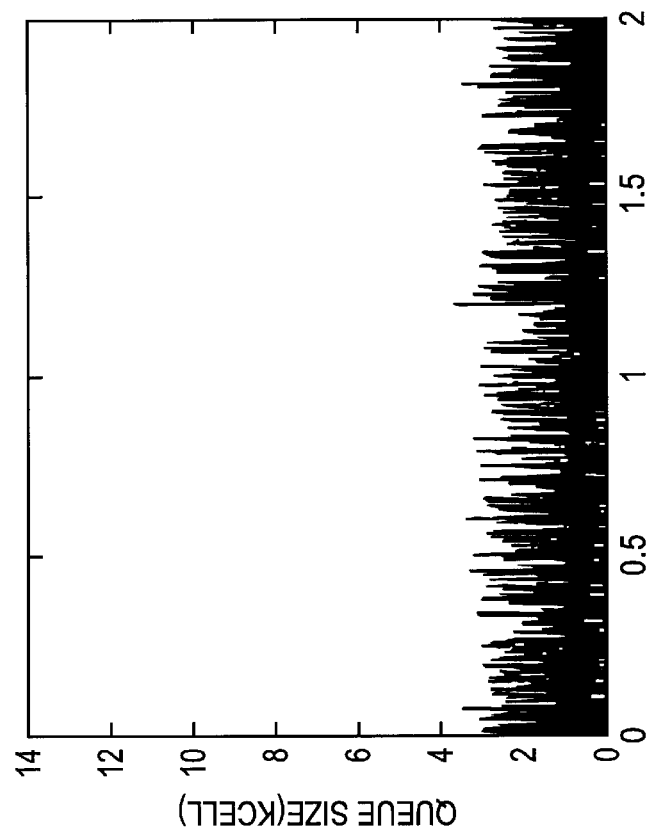
FIGS. 20(a) and 20(b), respectively, are plots of buffer occupancy of the EFCI and EFCI-ECD schemes for the 100 segment MPEG case.

The EFCI scheme is first applied to the above single-node network. The control parameters Additive Increase Rate (AIR), Rate Decrease Factor (RDF), and the queue threshold $Q_t$ are properly adjusted to achieve the target overall link utilization $\rho$=90%. For the 10 MPEG case, (AIR, RDF)=(0.2 Mbps, 0.5) for $Q_t$=200 cells. For the 100 MPEG case, (AIR, RDF)=(1.8 Mbps, 0.5) for $Q_t$=2000 cells. In both cases, $\rho_{MPEG}$=0.33 and $\rho_{ABR}$=0.56. Illustrated in FIG. 19(a) and FIG. 20(a) are the resulting buffer occupancy behavior of a 2 minute period. In the 10 MPEG case, the average queue is 550 and the maximum is 1,800. In the 100 MPEG case, the average queue is 4,500 and the maximum is 14,000. The sample path used in FIG. 17 is taken from this simulation of the 10 MPEG case.

Now apply the EFCI-ECD scheme of the present invention to the same network. The values of the source control parameters AIR and RDF are kept unchanged as used for the EFCI scheme. The low pass filter, which is required to obtain the filtered CBR/VBR rate, is designed by a simple 100 step moving average operation with the time step unit 1.4 ms. Note that the low pass filtering operation at the node requires some filtering delay in CBR/VBR traffic measurement. Such a filtering delay was considered above.

Figure 20B:
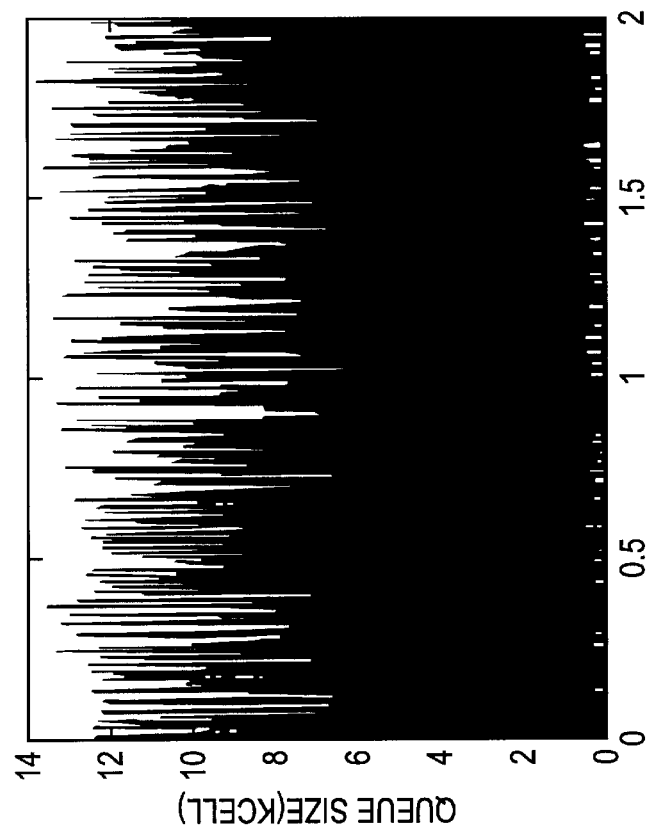

To achieve the same target utilization $\rho$=90%, the bandwidth threshold is simply set at 90% of the link capacity in both 10 MPEG and 100 MPEG cases. The resulting buffer occupancy behavior are shown in FIG. 19(b) and FIG. 20(b). For the 10 MPEG case, the average and maximum queues are found equal to (115, 700), as reduced from (500, 1800) of the FCI scheme. Similarly for the 100 MPEG case, the, average and maximum queues are (830, 4000), as reduced from (4500, 14000) of the EFCI scheme.

The aggregate ABR traffic of both schemes for the one second period from t=99 sec to t=10 sec are shown in FIG.

Figure 21:
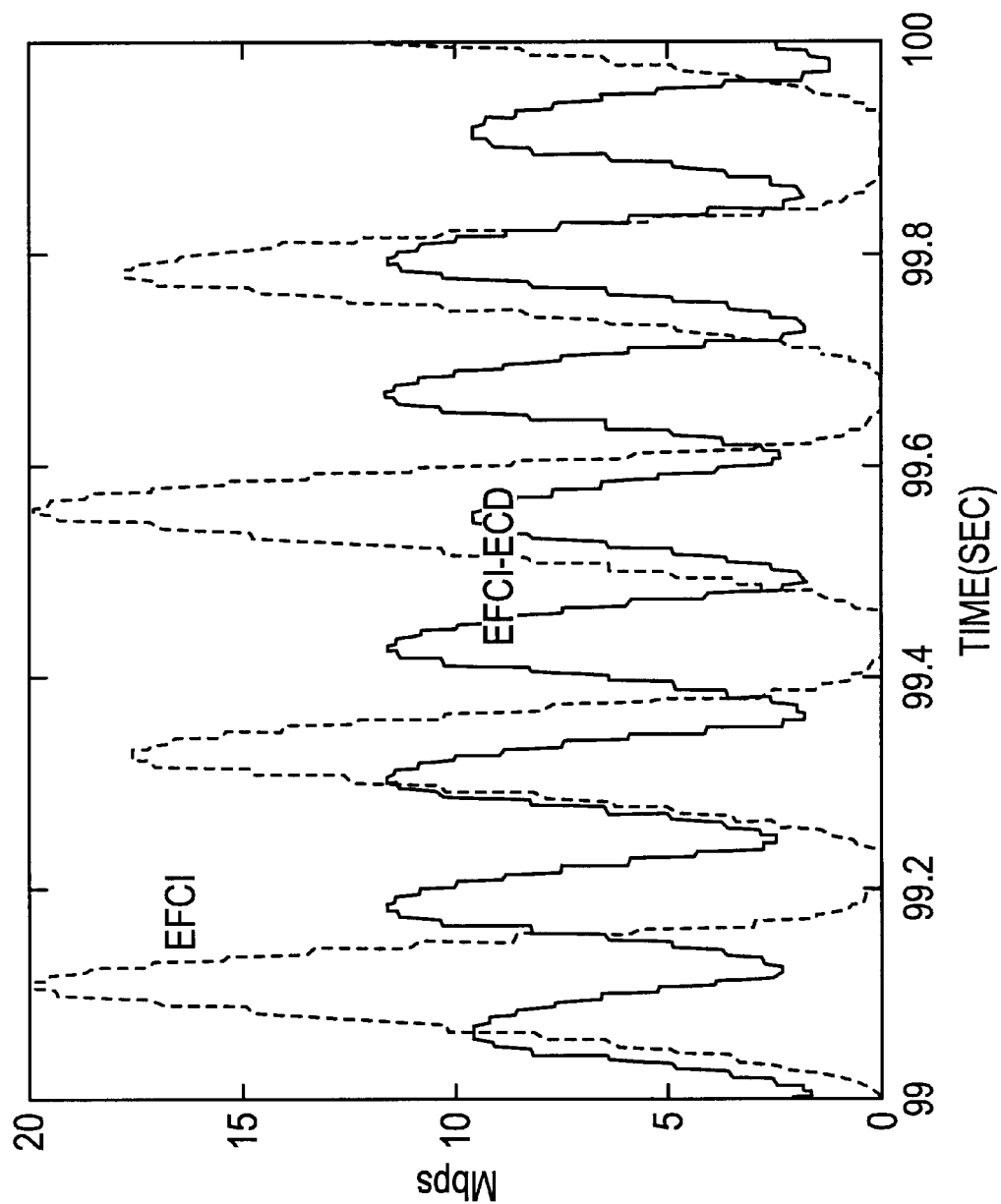
FIG. 21 is a plot of the aggregated ABR traffic rate for the EFCI-ECD and EFCI schemes over a period of one second.

21. It is easy to see that the ABR oscillation amplitude of the EFCI-ECD scheme is about half of the EFCI scheme. This explains why the queuing performance of the EFCI-ECD of the invention is significantly better than that of the EFCI scheme. Since the source control parameters in both schemes are identical, the EFCI-ECD improvement is mainly achieved through the much accelerated ABR traffic response. As seen in FIG. 21, the oscillation period of the EFCI-ECD is only about one half the oscillation period of the EFCI. As described above with reference to FIG. 17, this is attributed to the much reduced congestion periods achieved by the bandwidth threshold detection.

Figure 23:
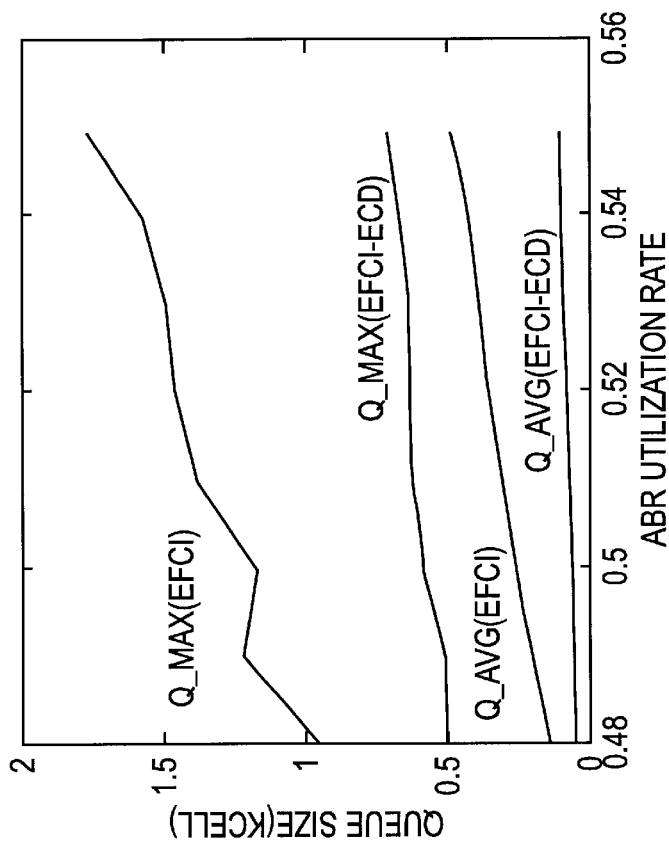
FIG. 23 is a plot showing the comparison of maximum/average queue at different utilization rates.
Figure 22:
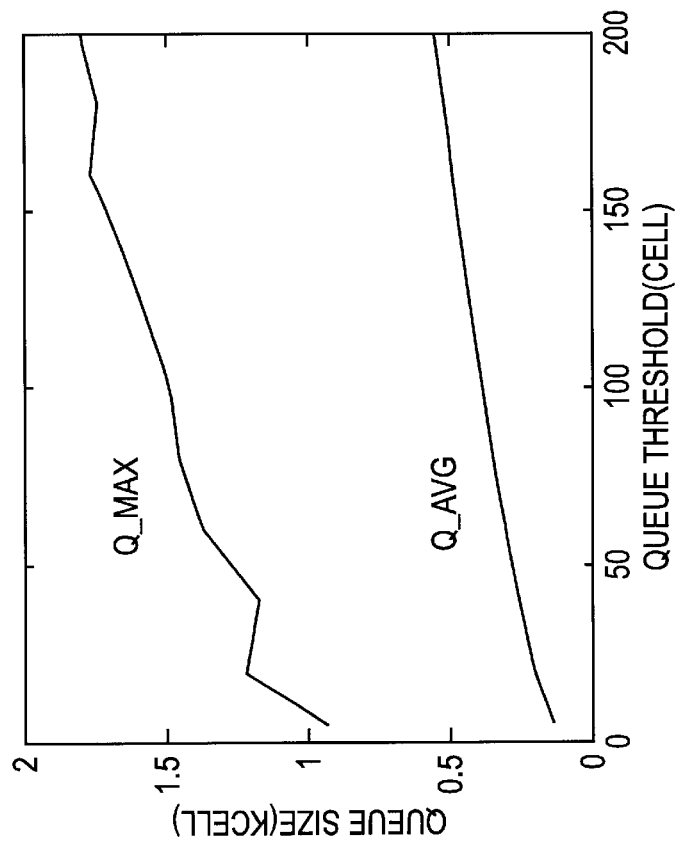
FIG. 22 is a plot showing the effect of the queue length at time t on maximum/average queue for the EFCI scheme.

The above comparison is made for a given control parameter AIR with a fixed queue threshold $Q_t$. Now examine the effect of AIR and $Q_t$ on performance. Taking the 10 MPEG case, first fix (AIR, RDF) at (0.2 Mbps, 0.5) and adjust $Q_t \epsilon$[5, 200]. The corresponding average and maximum queuing performance of the EFCI scheme is plotted in FIG. 22. Note that every adjustment of $Q_t$ will yield a different ABR link utilization $\rho_{ABR}$. The queuing performance in FIG. 22 is replotted in FIG. 23 as a function of $\rho_{ABR}$. For comparison purposes, also in FIG. 23 the average and maximum queuing performance of the EFCI-ECD scheme as a function of the same $\rho_{ABR}$ is shown. In the design of the EFCI-ECD scheme, the bandwidth threshold is assigned by $\rho = \rho_{ABR} + \rho_{MPEG}$ at each given $\rho_{ABR}$. The same degree of 60% buffer capacity saving is achieved by the EFCI-ECD scheme for different $\rho_{ABR}$'s (so as for different $Q_t$'s of the EFCI scheme).

Figure 24:
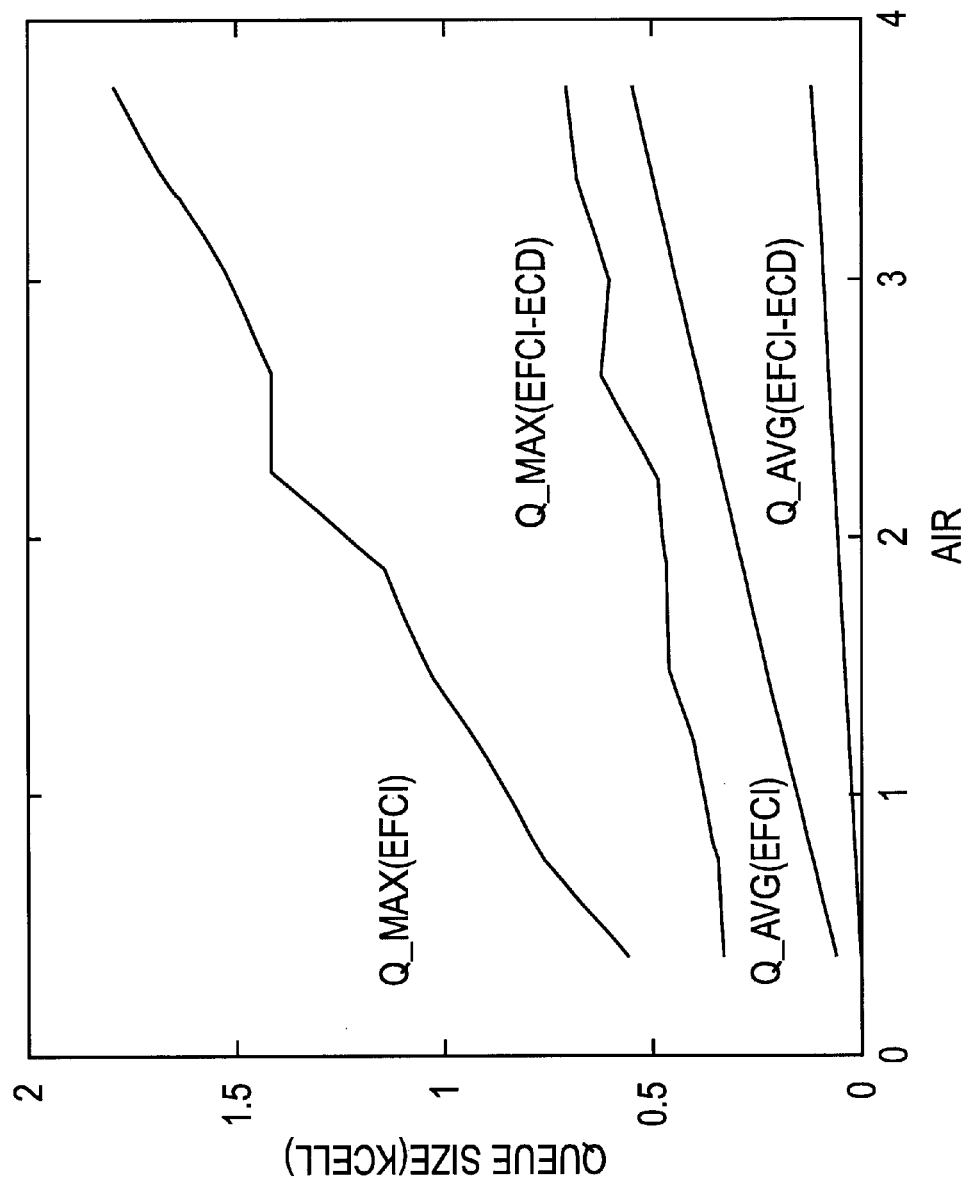
FIG. 24 is a comparison of maximum/average queue for different additive increase rates.

Similarly, $(Q_t, RDF)$ can be fixed at (200, 0.5) while AIR $\epsilon$[0.2 Mbps, 2 Mbps] is adjusted. The maximum and average queuing solutions of the two schemes are compared in FIG. 24. At each given AIR, first $\rho_{ABR}$ of the EFCI scheme is identified. The same AIR and $p_{ABR}$ are then used in the design of the EFCI-ECD scheme for the comparison. In other words, the queue comparison in FIG. 24 is based on equal link utilization for the two schemes. Again, about the same degree of buffer capacity savings has been achieved. Note that RDF is not a sensitive parameter for both schemes as long as RDF$\leq$0.5. Its effect on the queuing performance comparison has been omitted.

As compared to the existing queue threshold scheme, the bandwidth threshold scheme of the present invention has the general effect of alleviating ABR traffic oscillations, resulting in a significant saving of buffer resources.

6. CONCLUSION

The present invention comprises an explicit rate ABR feedback control scheme where the effects of multiloop delays and underlying high priority traffic are fully considered. Two distinct techniques are used to significantly improve the ABR control performance. First, the ABR traffic in the dynamic model design is only adapted to the low frequency variation of high priority traffic. As a result, not only is the variation of the ABR traffic much smoother, but the control stability is remarkably improved. Secondly, the GPC control method has been successfully applied to eliminate the low frequency, high magnitude ABR traffic oscillations. Compared to the existing ABR control schemes, the control scheme of the present invention can achieve a significantly higher link utilization with much less buffer space requirement.

Thus, according to the features and aspects of the present invention, a new bandwidth threshold detection scheme is provided to modify the original EFCI scheme for early congestion detection. More than 60% of buffer resource savings is observed in the simulation study using the proposed EFCI-ECD scheme.

Although the embodiments of the present invention have been described with reference to the accompanying drawings, many modifications and changes may be made by those skilled in the art without departing from the scope of the invention.

What is claimed is:

1. A traffic congestion control apparatus for use in a network having a plurality of types of data traffic, the data traffic comprising high priority traffic and low priority traffic, the network having a plurality of links through which the data traffic flows, each of the links being susceptible to data traffic congestion, the apparatus comprising:
   a filter that filters the data traffic;
   a sampler that samples a characteristic of the data traffic filtered by the filter, the characteristic of the data traffic indicating a present link capacity requirement of the filtered traffic; and
   a flow control system that adjusts the transmission rate of the low priority traffic in response to the sampled characteristic.

2. The traffic congestion control apparatus in accordance with claim 1, wherein the sampled characteristic is a low frequency bandwidth.

3. The traffic congestion control apparatus in accordance with claim 2, wherein the network is an asynchronous transfer method (ATM) network.

4. The traffic congestion control apparatus in accordance with claim 3, wherein the high priority data traffic comprises constant bit rate (CBR) traffic and variable bit rate (VBR) traffic, and the low priority traffic comprises available bit rate (ABR) traffic.

5. The traffic congestion control apparatus in accordance with claim 1, further comprising a queue buffer which temporarily stores the data traffic before the data traffic flows through each of the links.

6. The traffic congestion control apparatus in accordance with claim 5, wherein the queue buffer is a SRAM.

7. The traffic congestion control apparatus in accordance with claim 1, in which the filter further comprises a low pass filter.

8. The traffic congestion control apparatus in accordance with claim 1, in which the filter further comprises a digital signal processor.

9. The traffic congestion control apparatus in accordance with claim 8, wherein the filtering operation comprises a multiple step moving average operation having a predetermined time step unit.

10. The traffic congestion control apparatus in accordance with claim 1, wherein the filter filters only the high priority traffic.

11. The traffic congestion control apparatus in accordance with claim 2, further comprising a controller that calculates an optimal low priority traffic flow rate based on the measured low frequency bandwidth of the filtered data traffic and a total link capacity, the controller indicating to the flow control system an amount to adjust the low priority data traffic flow based on the calculated optimal low priority traffic flow rate.

12. The traffic congestion control apparatus in accordance with claim 11, wherein the controller further determines a round trip delay and accounts for the round trip delay in the calculation of the optimal low priority traffic flow rate.

13. The traffic congestion control apparatus in accordance with claim 12, further comprising a plurality of flow control systems, each of the flow control systems being associated with each link, the controller indicating the optimal flow rate to each of the plurality of flow control systems.

14. The traffic congestion control apparatus in accordance with claim 13, wherein each of the flow control systems controls a flow of a plurality of low priority inputs and the controller accounts for the number of inputs to each flow control system to determine the optimal flow rate for each flow control system.

15. The traffic congestion control apparatus in accordance with claim 11, wherein the controller utilizes a Generated Prediction Control process to eliminate low frequency, high magnitude oscillations of the low priority traffic flow rate.

16. A method for controlling congestion in a network having data traffic comprising high priority traffic and low priority traffic, the low priority traffic being transmitted by a plurality of data inputs, the network comprising a plurality of links through which the data traffic flows, the method comprising:

filtering the data traffic;

periodically sampling the filtered traffic to estimate a present link capacity required by the high priority traffic; and adjusting a transmission flow rate of each data input to match a transmission rate that minimizes an unused link capacity of each link subject to no congestion.

17. The method for controlling congestion in a network of claim 16, wherein the filtering comprises passing the data traffic through a low pass filter.

18. The method for controlling congestion in a network of claim 17, wherein the sampling comprises measuring the low frequency bandwidth of the filtered traffic.

19. The method for controlling congestion in a network of claim 16, wherein the filtered data traffic includes the high priority traffic.

20. A congestion control method for a high speed network comprising a plurality of network nodes, each node receiving network traffic comprising high priority traffic and low priority traffic, the method comprising:

determining a link capacity at each node by analyzing low frequency characteristics of the traffic; and adjusting a transmission flow rate of low priority traffic based upon the determined link capacity.

21. The method of claim 20, in which the network traffic comprises constant bit rate traffic, variable bit rate traffic, and available bit rate traffic.

22. The method of claim 20, in which the network traffic comprises constant bit rate traffic, and variable bit rate traffic.

23. The method of claim 20, in which the adjusting further comprises controlling a transmission rate of the low priority traffic to obtain a target high utilization of link capacity.

24. The method of claim 23, in which the controlling further comprises controlling the low priority traffic using a generalized predictive control method.

25. The method of claim 20, in which the determining further comprises determining an arrival rate of all traffic, and filtering the arrival rate of each channel in a low frequency band to obtain filtered arrival rates.

26. The method of claim 25, further comprising comparing filtered arrival rates to a link to an output port of a node, and determining the node is congested when a sum of the filtered arrival rates of the input port are greater than the link speed.

27. The method of claim 25, in which the filtering comprises low pass filtering.

* * * * *

UNITED STATES PATENT AND TRADEMARK OFFICE
CERTIFICATE OF CORRECTION

PATENT NO. : 6,826,151 B1
APPLICATION NO. : 09/488926
DATED : November 30, 2004
INVENTOR(S) : S. Li et al.

It is certified that error appears in the above-identified patent and that said Letters Patent is hereby corrected as shown below:

On the title page of the printed patent, at Item (75), Inventor, the following first-named inventor should be added: --Yongdong Zhao--.

On title page of the printed patent, at Item (56), References Cited, the following Other Documents were omitted and should be included:

--"On Closed_Loop rate Control for ATM Cell Relay Networks", M. HLUCHUJ et al., IEEE 0743-166X/94.--
--Dynamical Behavior of Rate-Based Flow Control Mechanisms", J.C. BOLOT et al:--
--"The OSU Scheme for Congestion Avoidance in ATM Networks Using Explicit Rate Indication", R. JAIN et al., OSU Tech Report OSU-CISRC-1/96 TR02.--
--"Feedback Control of Congestion in Packet Switching Networks: The Case of a Single Congested Node", L. BENMOHAMED et al., IEEE/ACM Transactions on Networking Vol. 1, No. 6, Dec. 1993, IEEE Log. No. 9215398 1993.--
--"Queue Response to Input Correlation Functions: Continuous Spectral Analysis", S.Q. LI et al., IEEE/ACM Transactions on Networking Vol. 1, No. 6, Dec. 1993, IEEE Log No. 9215397.--
--Link Capacity Allocation and Network Control by Filtered Input Rate in High Speed Networks", S.Q. LI et al., IEEE Globecom '93 Conference, Houston, Texas, Dec. 1993.--
--The Linearity of Low Frequency Traffic Flow: An Intrinsic I/O Property in Queuing System", S.Q. LI et al.--
--"Generalized Predictive Control-Part I. The Basic Algorithm" and Part II Extensions and Interpretations, D.W. CLARK, et al., International Federation of Automatic Control, 1987.--
--Analysis, Modeling and Generation of Self-Similar VBR Video Traffic", M.W. GARRETT et al., SIGCOMM 94 London England UK, August 1994.--

Signed and Sealed this

Twenty-second Day of May, 2007

JON W. DUDAS
*Director of the United States Patent and Trademark Office*